(12) United States Patent
Meng

(10) Patent No.: US 12,541,023 B2
(45) Date of Patent: Feb. 3, 2026

(54) IMAGING METHOD AND APPARATUS, RADAR SYSTEM, ELECTRONIC DEVICE, AND STORAGE MEDIUM

(71) Applicant: Shenzhen Yinwang Intelligent Technologies Co., Ltd., Shenzhen (CN)

(72) Inventor: Hui Meng, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 427 days.

(21) Appl. No.: 18/160,169

(22) Filed: Jan. 26, 2023

(65) Prior Publication Data

US 2023/0168370 A1 Jun. 1, 2023

Related U.S. Application Data

(63) Continuation of application No. PCT/CN2021/100389, filed on Jun. 16, 2021.

(30) Foreign Application Priority Data

Jul. 30, 2020 (CN) .......................... 202010753975.7

(51) Int. Cl.
*G01S 13/931* (2020.01)
*G01S 7/41* (2006.01)
*G01S 13/90* (2006.01)

(52) U.S. Cl.
CPC ............ *G01S 13/931* (2013.01); *G01S 7/412* (2013.01); *G01S 13/9029* (2013.01)

(58) Field of Classification Search
CPC ..... G01S 13/9029; G01S 7/412; G01S 13/931
See application file for complete search history.

(56) References Cited

U.S. PATENT DOCUMENTS 6,923,080 B1 8/2005 Dobler et al.
11,448,754 B2 * 9/2022 Cattle .................. G01S 13/343
(Continued)

FOREIGN PATENT DOCUMENTS

CN 103308923 A 9/2013
CN 109507670 A 3/2019
(Continued)

OTHER PUBLICATIONS

L. Li, C. Li, M. He and C. Duan, "Imaging experiment based on airship-born SAR for long synthetic aperture time," 2019 6th Asia-Pacific Conference on Synthetic Aperture Radar (APSAR), Xiamen, China, 2019, pp. 1-4, doi: 10.1109/APSAR46974.2019.9048401. (Year: 2019).*

(Continued)

*Primary Examiner* — Marcus E Windrich
(74) *Attorney, Agent, or Firm* — Leydig, Voit & Mayer, Ltd.

(57) ABSTRACT

An imaging method and apparatus, a radar system, an electronic device, and a storage medium are provided. A first target image is obtained by obtaining at least two groups of original radar data from different radars, and performing image registration and time-domain coherent superposition. Each group of original radar data corresponds to one radar. The original radar data from the different radars includes different radar information. After image registration and time-domain coherent superposition are performed on the original radar data, the obtained first target image has higher physical resolution. Therefore, resolution of a generated radar image is improved, image information in the radar image is enriched, and positioning accuracy and driving safety of a vehicle are improved.

18 Claims, 16 Drawing Sheets

(56) References Cited

U.S. PATENT DOCUMENTS

| | | | |
|---|---|---|---|
| 2019/0079177 A1* | 3/2019 | Lee | G01S 13/422 |
| 2019/0324134 A1* | 10/2019 | Cattle | G01S 7/024 |
| 2021/0208272 A1* | 7/2021 | Lavian | H03L 7/091 |
| 2021/0311181 A1* | 10/2021 | Chae | G01S 13/931 |
| 2021/0396870 A1* | 12/2021 | Löffler | G01S 13/931 |
| 2024/0012127 A1* | 1/2024 | Campbell | G01S 13/582 |

FOREIGN PATENT DOCUMENTS

| | | |
|---|---|---|
| CN | 109541597 A | 3/2019 |
| CN | 111344597 A | 6/2020 |
| JP | 2013124912 A | 6/2013 |

OTHER PUBLICATIONS

Yang "Study on Location of Spaceborne Synthetic Aperture Radar Image and Extraction Digital Elevation Model from Spaceborne Interferometric Synthetic Aperture Radar Image," Wuhan University, Wuhan, P.R. China, Total 147 pages (Mar. 2004). With an English Abstract.

Zhimin et al., "Ultra-wideband Ground-Penetrating Imaging Radar," National Defense Industry Press, total 39 pages (Mar. 31, 2013).

* cited by examiner

IMAGING METHOD AND APPARATUS, RADAR SYSTEM, ELECTRONIC DEVICE, AND STORAGE MEDIUM

CROSS-REFERENCE TO RELATED APPLICATIONS

This application is a continuation of International Application No. PCT/CN2021/100389, filed on Jun. 16, 2021, which claims priority to Chinese Patent Application No. 202010753975.7, filed on Jul. 30, 2020. The disclosures of the aforementioned applications are hereby incorporated by reference in their entireties.

TECHNICAL FIELD

Embodiments of this application relate to the field of vehicle advanced intelligent sensing technologies, and in particular, to an imaging method and apparatus, a radar system, an electronic device, and a storage medium.

BACKGROUND

With social development, intelligent terminals such as an intelligent transportation device, a smart home device, and a robot are gradually entering people's daily lives. An example in which an intelligent terminal is an intelligent transportation device is used. With rise of automobile self-driving industry, an era of intelligent driving is coming. A synthetic aperture radar (SAR) technology capable of performing two-dimensional high-resolution imaging in an all-day and all-weather manner has attracted more and more attention.

In the conventional technology, for a vehicle with an autonomous driving or automatic parking function, a conventional sensing device such as a camera or an ultrasonic radar is usually used to implement positioning and driving guidance of the vehicle. In a related technology, the foregoing objective may also be implemented by using a synthetic aperture radar. However, in an existing vehicle-mounted synthetic aperture radar system, a generated radar image has low resolution, which affects positioning accuracy and driving safety of the vehicle.

SUMMARY

An objective of this application is to provide an imaging method and apparatus, a radar system, an electronic device, and a storage medium. This application is used to solve a problem that low resolution of a radar image generated by a vehicle-mounted synthetic aperture radar system affects positioning accuracy and driving safety of a vehicle.

According to a first aspect, this application discloses an imaging method, including:
 obtaining at least two groups of original radar data, where the at least two groups of original radar data are from at least two radars; and synthesizing a first target image based on the at least two groups of original radar data, where the first target image is obtained by performing image registration and time-domain coherent superposition on the at least two groups of original radar data.

Based on the foregoing technical content, the first target image is obtained by obtaining the at least two groups of original radar data from different radars, and performing image registration and time-domain coherent superposition. Each group of original radar data corresponds to one radar. The original radar data from the different radars includes different radar information. After image registration and time-domain coherent superposition are performed on the original radar data, the obtained first target image has higher physical resolution and richer image information. Therefore, resolution of a generated radar image is improved, image information in the radar image is enriched, and positioning accuracy and driving safety of a vehicle are improved.

In a possible implementation, the obtaining at least two groups of original radar data includes:
 determining at least two target radars based on preset radar configuration information; controlling the at least two target radars to respectively transmit radar beams in respective corresponding target directions; and obtaining echo data corresponding to the radar beams sent by the at least two target radars as the original radar data.

Based on the foregoing technical content, the at least two target radars are determined by using the preset radar configuration information, and the original radar data is obtained by using the at least two target radars. Because the radar configuration information may be adjusted and set based on a specific requirement, an optimal radar that matches a current application scenario or an application requirement, that is, the target radar, may be selected from a plurality of vehicle-mounted radars, to improve use flexibility and an application scope of a radar system.

In a possible implementation, the radar configuration information includes at least one of radar identifier information, radar location information, and transmission angle information. The radar location information is used to represent a location of a radar, and the radar transmission angle information is used to represent a transmission angle of a radar.

Based on the foregoing technical content, the radar location information and the transmission angle information are set in the configuration information, so that a coverage area of the beam transmitted by the radar can be adjusted, and the radar beam can correspond to an optimal coverage area in different application scenarios and application requirements, to improve use flexibility and an application scope.

In a possible implementation, after the obtaining at least two groups of original radar data, the method further includes: performing delay processing on the at least two groups of original radar data, to implement phase consistency of the at least two groups of original radar data.

In a possible implementation, the performing delay processing on the at least two groups of original radar data, to implement phase consistency of the at least two groups of original radar data includes: obtaining an initial phase of reference radar data; and correcting a phase of other original radar data in the at least two groups of original radar data based on the initial phase of the reference radar data.

Based on the foregoing technical content, delay processing is performed on a plurality of groups of original radar data, so that phases of the plurality of groups of original radar data are aligned. When image superposition is performed subsequently, a better imaging result can be obtained, to improve positioning precision.

In a possible implementation, the synthesizing a first target image based on the at least two groups of original radar data includes: generating at least two corresponding groups of radar images based on the at least two groups of original radar data; performing image registration on the at least two groups of radar images, to obtain at least two groups of registered images corresponding to the at least two groups of radar images; and performing time-domain coherent superposition on the at least two groups of registered images, to obtain the first target image.

Based on the foregoing technical content, one group of radar images are correspondingly generated based on each of the at least two groups of original radar data. The radar images are generated by using original radar data collected by radars at different locations and angles, and image registration is performed on each group of radar images, so that different radar images generate an overlapping area, and then time-domain coherent superposition is performed on the registered images, to obtain the first target image. The first target image includes common images in radar images corresponding to different radars. Because bandwidth of original radar data that is collected by a single radar and that can cover a target detected object is too large, resolution of a radar image formed after processing is too low. The target detected object is detected by using narrow radar beams transmitted by a plurality of radars, and time-domain superposition is performed on radar images obtained through processing after collection, to obtain a high-resolution image, so as to improve positioning precision of the target detected object, implement accurate positioning of the vehicle, and improve safety of autonomous driving of the vehicle.

In a possible implementation, after the generating at least two corresponding groups of radar images based on the at least two groups of original radar data, the method further includes: obtaining preset radar configuration information; and performing geometric distortion correction on the radar images based on the radar configuration information.

In a possible implementation, the radar configuration information includes at least one of radar identifier information, radar location information, and radar transmission angle information; and the performing geometric distortion correction on the radar images based on the radar configuration information includes: obtaining radar image correction information based on the radar configuration information; and performing geometric distortion correction on the radar images based on the radar image correction information. The radar image correction information is information used to describe different sizes and shapes of vehicles, and installation locations and transmission angles of radars, and vehicles of different types or vehicles with different radar installation locations and angles have corresponding radar image correction information.

Based on the foregoing technical content, geometric distortion correction is performed, by using the preset radar configuration information, on the radar images that are collected by different radars and that are obtained after processing, so that precision of subsequent image registration and time-domain coherent superposition on the radar images can be improved, and a problem of low superposition precision that occurs when time-domain coherent superposition is performed on the radar images due to reasons such as different sizes of vehicles, and different installation locations and different transmission angles of radars can be avoided, thereby improving precision of time-domain superposition on the radar images.

In a possible implementation, the at least two groups of original radar data include one group of reference radar data; and the performing image registration on the at least two groups of radar images, to obtain at least two groups of registered images corresponding to the at least two groups of radar images includes: obtaining a reference radar image corresponding to the reference radar data; performing image translation on another radar image in the at least two groups of radar images based on a target element in the reference radar image, to overlap a target element in the another radar image and the target element in the reference radar image; and using the reference radar image and another radar image obtained after the image translation as the registered images.

In a possible implementation, after the performing image translation on another radar image in the at least two groups of radar images based on a target element in the reference radar image, to overlap a target element in the another radar image and the target element in the reference radar image, the method further includes: obtaining phase information in the reference radar image; performing phase registration on another radar image based on the phase information, to enable a phase of the another radar image in the at least two groups of radar images to be consistent with a phase of the reference radar image; and using the reference radar image and another radar image obtained after the phase registration as the registered images.

Based on the foregoing technical content, the reference radar image corresponding to the reference radar data is obtained. The reference radar data may be determined by using the radar configuration information or a specific application scenario, and image translation and phase registration are performed on another radar image based on the reference radar image, to generate a registered image. Because the registered images are already aligned in terms of time domain and phase, the registered images may be directly superimposed, to obtain the first target image, so as to improve precision and resolution of the generated first target image.

In a possible implementation, the registered image includes a co-view region image and a non-co-view region image, and co-view region images of different registered images overlap with each other; and the performing time-domain coherent superposition on the at least two groups of registered images, to obtain the first target image includes: obtaining co-view region images of the at least two groups of registered images; and performing time-domain superposition on the co-view region images of the at least two groups of registered images, to obtain the first target image.

Based on the foregoing technical content, the registered image includes the co-view region image used to describe a target detected object, and the co-view region images of different registered images overlap with each other. Time-domain coherent superposition is performed on co-view regions of a plurality of registered images, so that a co-view-region-superimposed image with higher resolution, that is, the first target image can be generated. The first target image is generated by superimposing a plurality of co-view region images. Therefore, compared with one radar image, the first target image has better image resolution and accuracy.

In a possible implementation, after the first target image is obtained, the method further includes: obtaining a location relationship between the registered images, and splicing non-co-view region images of the at least two groups of registered images on two sides of the first target image based on the location relationship between the registered images, to obtain a second target image.

Based on the foregoing technical content, non-co-view regions of a plurality of groups of registered images are spliced on two sides of the first target image based on a location relationship between different registered images, to obtain the second target image. Because the registered images are obtained after data collected by different radars is processed, non-co-view regions of the registered images include different image information. Non-co-view region images of the different registered images are spliced, so that the obtained second target image has a wider field of view and richer detection information, to further improve positioning precision and autonomous driving safety of a vehicle.

According to a second aspect, this application discloses an imaging apparatus, including:
a data obtaining module, configured to obtain at least two groups of original radar data, where the at least two groups of original radar data are from at least two radars; and an image generation module, configured to synthesize a first target image based on the at least two groups of original radar data, where the first target image is obtained by performing image registration and time-domain coherent superposition on the at least two groups of original radar data.

Based on the foregoing technical content, the imaging apparatus obtains the at least two groups of original radar data from different radars, and performs image registration and time-domain coherent superposition, to obtain the first target image. Each group of original radar data corresponds to one radar. The original radar data from the different radars includes different radar information. After image registration and time-domain coherent superposition are performed on the original radar data, the obtained first target image has higher physical resolution and richer image information. Therefore, resolution of a generated radar image is improved, image information in the radar image is enriched, and positioning accuracy and driving safety of a vehicle are improved.

In a possible implementation, the data obtaining module is specifically configured to: determine at least two target radars based on preset radar configuration information; control the at least two target radars to respectively transmit radar beams in respective corresponding target directions; and obtain echo data corresponding to the radar beams sent by the at least two target radars as the original radar data.

Based on the foregoing technical content, the at least two target radars are determined by using the preset radar configuration information, and the original radar data is obtained by using the at least two target radars. Because the radar configuration information may be adjusted and set based on a specific requirement, an optimal radar that matches a current application scenario or an application requirement, that is, the target radar, may be selected from a plurality of vehicle-mounted radars, to improve use flexibility and an application scope of a radar system.

In a possible implementation, the radar configuration information includes at least one of radar identifier information, radar location information, and radar transmission angle information. The radar location information is used to represent a location of a radar, and the radar transmission angle information is used to represent a transmission angle of a radar.

Based on the foregoing technical content, the radar location information and the transmission angle information are set in the configuration information, so that a coverage area of the beam transmitted by the radar can be adjusted, and the radar beam can correspond to an optimal coverage area in different application scenarios and application requirements, to improve use flexibility and an application scope.

In a possible implementation, the imaging apparatus further includes a delay processing module, configured to perform delay processing on the at least two groups of original radar data, to implement phase consistency of the at least two groups of original radar data.

In a possible implementation, the delay processing module is specifically configured to: obtain an initial phase of reference radar data; and correct a phase of other original radar data in the at least two groups of original radar data based on the initial phase of the reference radar data.

Based on the foregoing technical content, delay processing is performed on a plurality of groups of original radar data, so that phases of the plurality of groups of original radar data are aligned. When image superposition is performed subsequently, a better imaging result can be obtained, to improve positioning precision.

In a possible implementation, the image generation module is specifically configured to: generate at least two corresponding groups of radar images based on the at least two groups of original radar data; perform image registration on the at least two groups of radar images, to obtain at least two groups of registered images corresponding to the at least two groups of radar images; and perform time-domain coherent superposition on the at least two groups of registered images, to obtain the first target image.

Based on the foregoing technical content, one group of radar images are correspondingly generated based on each of the at least two groups of original radar data. The radar images are generated by using original radar data collected by radars at different locations and angles, and image registration is performed on each group of radar images, so that different radar images generate an overlapping area, and then time-domain coherent superposition is performed on the registered images, to obtain the first target image. The first target image includes common images in radar images corresponding to different radars. Because bandwidth of original radar data that is collected by a single radar and that can cover a target detected object is too large, resolution of a radar image formed after processing is too low. The target detected object is detected by using narrow radar beams transmitted by a plurality of radars, and time-domain superposition is performed on radar images obtained through processing after collection, to obtain a high-resolution image, so as to improve positioning precision of the target detected object, implement accurate positioning of the vehicle, and improve safety of autonomous driving of the vehicle.

In a possible implementation, the imaging apparatus further includes a distortion correction module, configured to: obtain preset radar configuration information; and perform geometric distortion correction on the radar images based on the radar configuration information.

In a possible implementation, the radar configuration information includes at least one of radar identifier information, radar location information, and radar transmission angle information; and when performing geometric distortion correction on the radar images based on the radar configuration information, the distortion correction module is specifically configured to: obtain radar image correction information based on the radar configuration information; and perform geometric distortion correction on the radar images based on the radar image correction information.

Based on the foregoing technical content, geometric distortion correction is performed, by using the preset radar configuration information, on the radar images that are collected by different radars and that are obtained after processing, so that precision of subsequent image registration and time-domain coherent superposition on the radar images can be improved, and a problem of low superposition precision that occurs when time-domain coherent superposition is performed on the radar images due to reasons such as different sizes of vehicles, and different installation locations and different transmission angles of radars can be avoided, thereby improving precision of time-domain superposition on the radar images.

In a possible implementation, the at least two groups of original radar data include one group of reference radar data; and when performing image registration on the at least two groups of radar images, to obtain at least two groups of registered images corresponding to the at least two groups of radar images, the image generation module is specifically configured to: obtain a reference radar image corresponding to the reference radar data; perform image translation on another radar image in the at least two groups of radar images based on a target element in the reference radar image, to overlap a target element in the another radar image and the target element in the reference radar image; and use the reference radar image and another radar image obtained after the image translation as the registered images.

In a possible implementation, after performing image translation on another radar image in the at least two groups of radar images based on a target element in the reference radar image, to overlap a target element in the another radar image and the target element in the reference radar image, the image generation module is specifically configured to: obtain phase information in the reference radar image; perform phase registration on another radar image based on the phase information, to enable a phase of the another radar image in the at least two groups of radar images to be consistent with a phase of the reference radar image; and use the reference radar image and another radar image obtained after the phase registration as the registered images.

Based on the foregoing technical content, the reference radar image corresponding to the reference radar data is obtained. The reference radar data may be determined by using the radar configuration information or a specific application scenario, and image translation and phase registration are performed on another radar image based on the reference radar image, to generate a registered image. Because the registered images are already aligned in terms of time domain and phase, the registered images may be directly superimposed, to obtain the first target image, so as to improve precision and resolution of the generated first target image.

In a possible implementation, the registered image includes a co-view region image and a non-co-view region image, and co-view region images of different registered images overlap with each other; and when performing time-domain coherent superposition on the at least two groups of registered images, to obtain the first target image, the image generation module is specifically configured to: obtain co-view region images of the at least two groups of registered images; and perform time-domain superposition on the co-view region images of the at least two groups of registered images, to obtain the first target image.

Based on the foregoing technical content, the registered image includes the co-view region image used to describe a target detected object, and the co-view region images of different registered images overlap with each other. Time-domain coherent superposition is performed on co-view regions of a plurality of registered images, so that a co-view-region-superimposed image with higher resolution, that is, the first target image can be generated. The first target image is generated by superimposing a plurality of co-view region images. Therefore, compared with one radar image, the first target image has better image resolution and accuracy.

In a possible implementation, after obtaining the first target image, the image generation module is specifically configured to: obtain a location relationship between the registered images, and splice non-co-view region images of the at least two groups of registered images on two sides of the first target image based on the location relationship between the registered images, to obtain a second target image.

Based on the foregoing technical content, non-co-view regions of a plurality of groups of registered images are spliced on two sides of the first target image based on a location relationship between different registered images, to obtain the second target image. Because the registered images are obtained after data collected by different radars is processed, non-co-view regions of the registered images include different image information. Non-co-view region images of the different registered images are spliced, so that the obtained second target image has a wider field of view and richer detection information, to further improve positioning precision and autonomous driving safety of a vehicle.

According to a third aspect, this application discloses a radar system. The radar system includes a processor, a memory, and at least two synthetic aperture radars. The processor is configured to control the synthetic aperture radar to receive and send a signal. The memory is configured to store a computer program. The processor is further configured to invoke and run the computer program stored in the memory, to enable the radar system to perform the method according to any one of the implementations of the foregoing first aspect.

According to a fourth aspect, this application discloses an electronic device, including a processor, a memory, and a transceiver.

The processor is configured to control the transceiver to receive and send a signal. The memory is configured to store a computer program. The processor is further configured to invoke and run the computer program stored in the memory, to enable the electronic device to perform the method according to any one of the implementations of the foregoing first aspect.

According to a fifth aspect, this application discloses a computer-readable storage medium, including computer code. When the computer code is run on a computer, the computer is enabled to perform the method according to any one of the implementations of the foregoing first aspect.

According to a sixth aspect, this application discloses a computer program product, including program code. When a computer runs the computer program product, the program code performs the method according to any one of the implementations of the foregoing first aspect.

According to a seventh aspect, this application discloses a chip, including a processor. The processor is configured to invoke and run a computer program stored in a memory, to perform a corresponding operation and/or procedure performed in the imaging method in embodiments of this application. Optionally, the chip further includes the memory. The memory is connected to the processor through a circuit or a wire. The processor is configured to read and execute the computer program in the memory. Further, optionally, the chip further includes a communication interface, and the processor is connected to the communication interface. The communication interface is configured to receive data and/or information that needs to be processed. The processor obtains the data and/or the information from the communication interface, and processes the data and/or the information. The communication interface may be an input/output interface.

According to an eighth aspect, an embodiment of this application provides a terminal. The terminal may be an uncrewed aerial vehicle, an unmanned transport vehicle, a vehicle, a flight vehicle, a robot, or the like. In a design, the terminal includes the radar system according to the foregoing third aspect, and can perform, by using the radar system, the imaging method according to any one of the implementations of the foregoing first aspect. In a design, the terminal includes the computer-readable storage medium according to the foregoing fifth aspect.

With reference to the foregoing technical solutions, in this application, a first target image is obtained by obtaining at least two groups of original radar data from different radars, and performing image registration and time-domain coherent superposition. Each group of original radar data corresponds to one radar. The original radar data from the different radars includes different radar information. After image registration and time-domain coherent superposition are performed on the original radar data, the obtained first target image has higher physical resolution and richer image information. Therefore, resolution of a generated radar image is improved, image information in the radar image is enriched, and positioning accuracy and driving safety of a vehicle are improved.

DESCRIPTION OF EMBODIMENTS

The following explains and describes some terms in this application, to facilitate understanding by a person skilled in the art. It should be noted that, when solutions in embodiments of this application are applied to the 5G system, an existing system, or another system that may appear in the future, a name of a device may change, but this does not affect implementation of the solutions in embodiments of this application.

(1) A synthetic aperture radar is a high-resolution imaging radar. The synthetic aperture radar actively transmits microwave, to implement detection in various complex environments and generate a high-resolution radar image similar to an image obtained through optical photography. The synthetic aperture radar has the following advantages: small size, light weight, high imaging precision, and low environmental impact. For explanations of the synthetic aperture radar, refer to descriptions in the conventional technology.

(2) "A plurality of" refers to two or more, and another quantifier is similar to this. The term "and/or" describes an association relationship between associated objects and indicates that three relationships may exist. For example, A and/or B may indicate the following three cases: Only A exists, both A and B exist, and only B exists. The character "/" generally indicates an "or" relationship between the associated objects.

(3) "Correspondence" may refer to an association relationship or a binding relationship, and that A corresponds to B refers to an association relationship or a binding relationship between A and B.

It should be noted that the nouns or terms used in embodiments of this application may be mutually referenced, and details are not described again.

Figure 1:
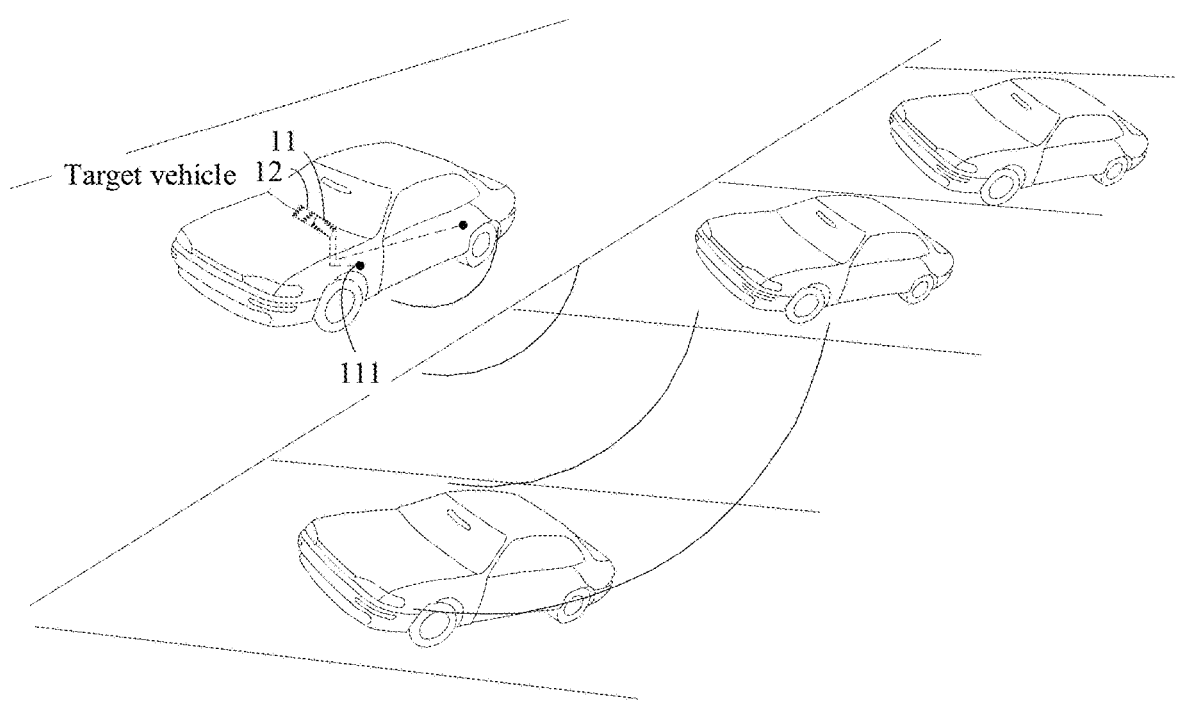
FIG. 1 is a schematic diagram of an application scenario according to an embodiment of this application.

FIG. 1 is a schematic diagram of an application scenario according to an embodiment of this application. As shown in FIG. 1, an imaging method provided in embodiments of this application may be applied to a radar system 11. The radar system 11 is installed in a target vehicle, and is used to implement functions such as positioning and obstacle identification of the target vehicle. Specifically, the radar system on the target vehicle includes a plurality of distributed synthetic aperture radars 111. The target vehicle may detect and sense a surrounding obstacle by using the radar system, and adjust a driving route based on a detection and sensing result, to effectively avoid the obstacle, or plan and adjust a proper driving route, so as to implement an autonomous driving function of the target vehicle.

For example, the imaging method provided in embodiments of this application may be further applied to a vehicle advanced intelligent sensing system 12, or a controller or a chip in the vehicle advanced intelligent sensing system 12.

The vehicle advanced intelligent sensing system 12 is disposed in the target vehicle. The vehicle advanced intelligent sensing system 12 obtains original radar data by using the radar system 11 installed in the target vehicle, processes and analyzes based on the original radar data, to obtain image information of a location and a surrounding environment of the target vehicle that are described by a user, and performs autonomous driving functions such as vehicle driving route planning and adjustment, and automatic parking based on the image information.

At present, due to excellent characteristics of the synthetic aperture radar, the synthetic aperture radar is widely used in satellite radar imaging and airplane radar imaging, namely, a spaceborne synthetic aperture radar system and an airborne synthetic aperture radar system. In an existing spaceborne synthetic aperture radar system and an airborne synthetic aperture radar system, in a usage scenario, data is usually collected for dozens of seconds and then processed offline, to meet requirements of data storage, heat dissipation, real-time performance, and the like.

Figure 2:
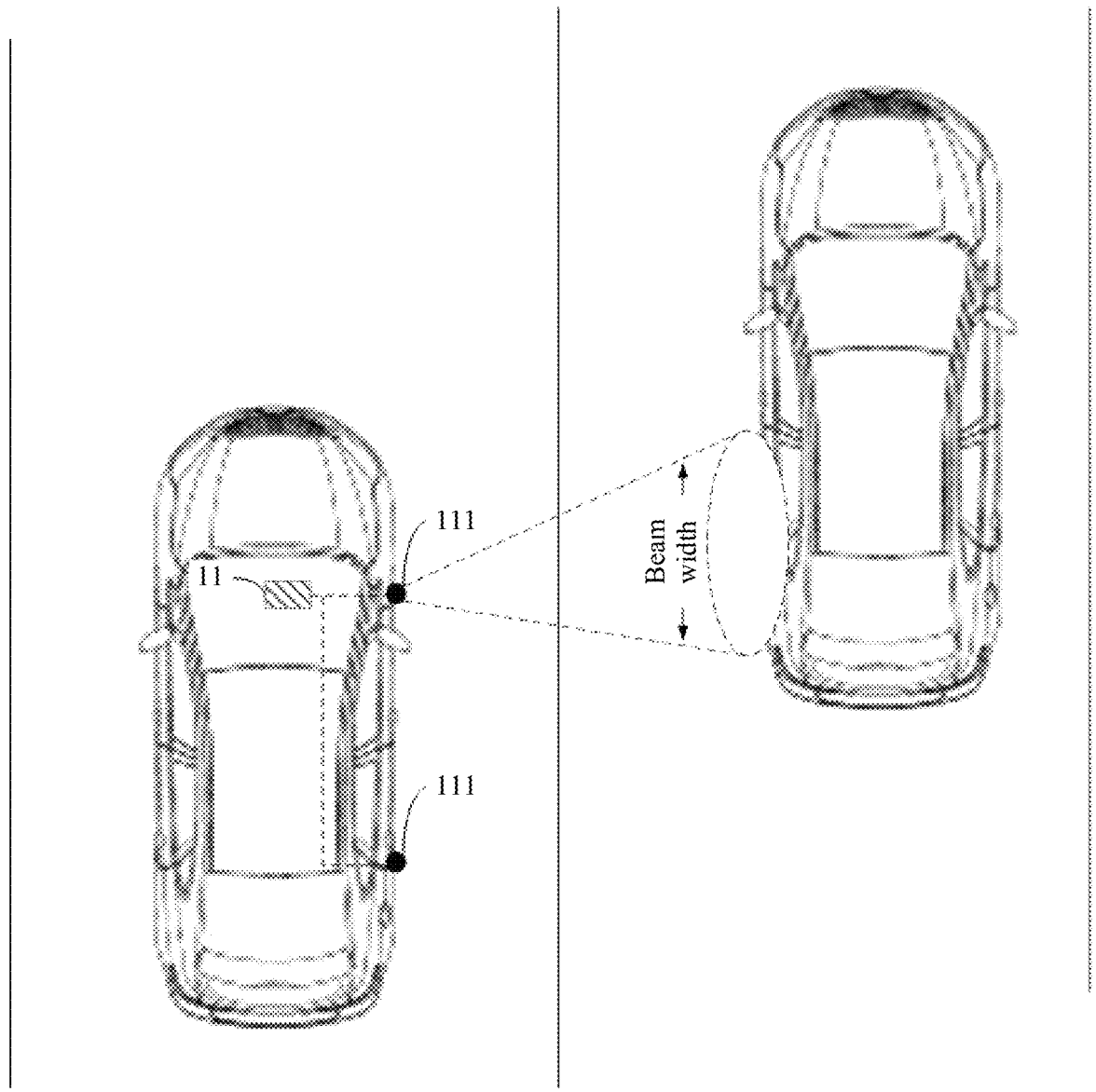
FIG. 2 is a schematic working diagram of a synthetic aperture radar system on an in-vehicle platform in a related technology.

However, on an in-vehicle platform, for a scenario, for example, autonomous driving, real-time performance needs to be first met. FIG. 2 is a schematic working diagram of a synthetic aperture radar system on an in-vehicle platform in a related technology. As shown in FIG. 2, if a vehicle-mounted aperture radar system 11 needs to implement real-time imaging, data obtaining and data processing need to be completed within a short time. Because an imaging scenario of the vehicle-mounted aperture radar system is close to a synthetic aperture radar 111, if real-time imaging is implemented, a short synthetic aperture length is required. Therefore, a beam width of an azimuth direction is limited, and image resolution of the azimuth direction is reduced. Further, if the image resolution is too low, accuracy of positioning and obstacle identification that are performed based on an image at a later stage is affected. Consequently, when a vehicle controller performs route planning and autonomous driving control on a vehicle, accuracy and safety are reduced.

To resolve the foregoing problems, in embodiments of this application, original radar data collected by a plurality of synthetic aperture radars is obtained, and is processed to generate a plurality of radar images, and image registration and time-domain coherent superposition are performed on the plurality of radar images, so that an imaging result with small beam bandwidth also has high image resolution, to improve accuracy of positioning and obstacle identification of a vehicle.

Figure 3:
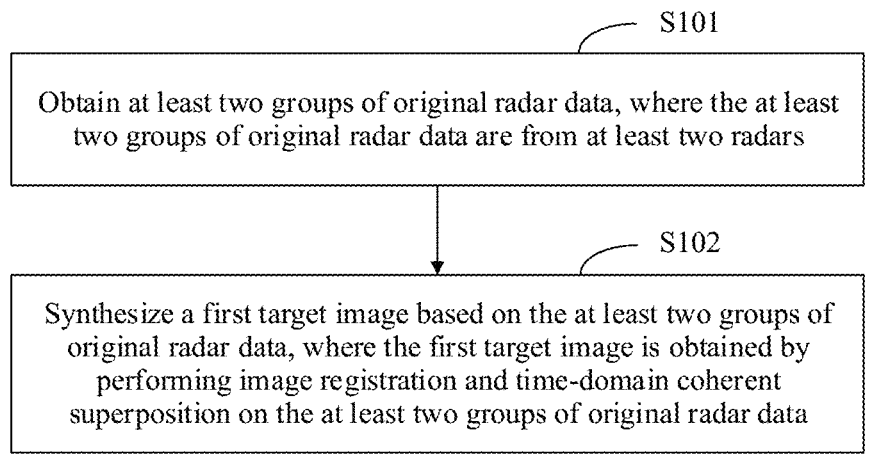
FIG. 3 is a schematic flowchart of an imaging method according to an embodiment of this application.

FIG. 3 is a schematic flowchart of an imaging method according to an embodiment of this application. An execution body of the imaging method provided in this embodiment may be a radar system. As shown in FIG. 3, the method includes the following steps.

S101: Obtain at least two groups of original radar data, where the at least two groups of original radar data are from at least two radars.

Figure 4:
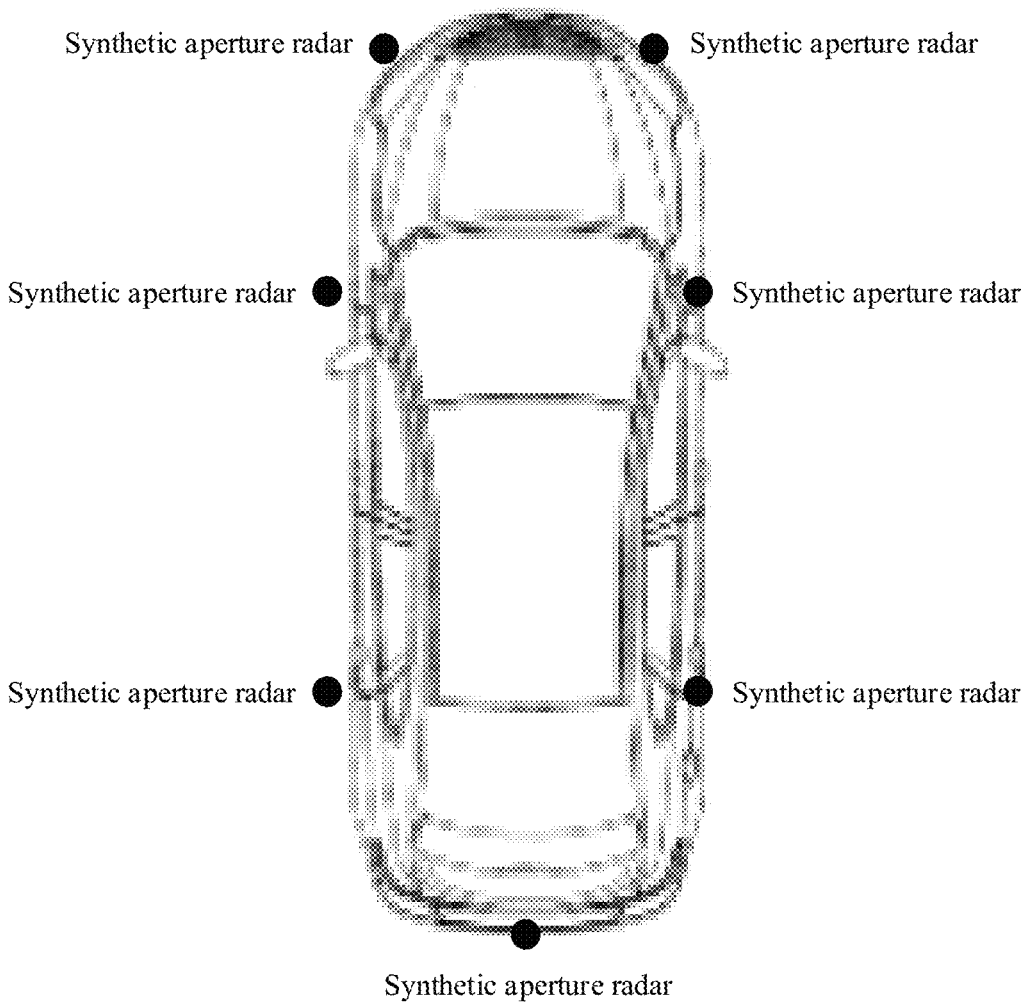
FIG. 4 is a schematic diagram of a disposition location of a synthetic aperture radar according to an embodiment of this application.

For example, the radar system includes at least two synthetic aperture radars, and a plurality of synthetic aperture radars are disposed in a target vehicle in a distributed manner. Optionally, FIG. 4 is a schematic diagram of a disposition location of a synthetic aperture radar according to an embodiment of this application. As shown in FIG. 4, the synthetic aperture radar may be disposed on one side outside a vehicle, or may be disposed on two adjacent edges outside a vehicle. The synthetic aperture radar may be disposed based on a specific requirement. This is not limited herein.

The synthetic aperture radar detects a target object by sending a radar beam and receiving an echo beam. A specific principle is not described herein again. After radar beams sent by different synthetic aperture radars encounter an effective obstacle, echoes are generated. The different synthetic aperture radars receive echo signals corresponding to the radar beams sent by the different synthetic aperture radars, that is, original radar data.

It may be understood that, when the execution body of the imaging method provided in this embodiment is the radar system or a similar radar module, apparatus, or device, the radar system or the similar radar module, apparatus, or device may obtain the original radar data by using the plurality of synthetic aperture radars according to the foregoing process. When the execution body of the imaging method provided in this embodiment is a system, a device, or a module that cannot directly obtain original radar data, such as a vehicle advanced intelligent sensing system, an in-car infotainment system, a controller or a chip in a vehicle advanced intelligent sensing system or an in-car infotainment system, or a cloud server, the system, the device, or the module communicates with the radar system or the similar radar module, apparatus, or device, and obtains the original radar data by using the radar system or the similar radar module, apparatus, or device. Details are not described herein again.

S102: Synthesize a first target image based on the at least two groups of original radar data, where the first target image is obtained by performing image registration and time-domain coherent superposition on the at least two groups of original radar data.

For example, the execution body is the radar system. After correspondingly obtaining a plurality of pieces of original radar data by using the plurality of synthetic aperture radars, the radar system respectively processes each group of original radar data based on at least one of a waveform, amplitude intensity, and time change feature of an electromagnetic wave in the original radar data, to generate a radar image corresponding to each group of original radar data. The radar image is image information generated after an image change is performed on the original radar data, and is used to describe information such as a spatial location, structure, and form of a detected target.

Each group of radar images correspond to one radar source. As a vehicle carrying the radar system moves, a radar beam transmitted by each radar covers an area, to form a plurality of coverage areas corresponding to different radars. An overlapping area exists in the plurality of coverage areas, and the detected target exists in the overlapping area, for example, an obstacle. To implement higher image resolution, different radar images are registered by using the overlapping area as a reference, so that overlapping areas of the different radar images are aligned, and then time-domain coherent superposition is performed, to form the first target image. The first target image can express an image of the detected target, and has higher resolution than a radar image formed by a single radar.

In this application, the first target image is obtained by obtaining the at least two groups of original radar data from different radars, and performing image registration and time-domain coherent superposition. Each group of original radar data corresponds to one radar. The original radar data from the different radars includes different radar information. After image registration and time-domain coherent superposition are performed on the original radar data, the obtained first target image has higher physical resolution and richer image information. Therefore, resolution of a generated radar image is improved, image information in the radar image is enriched, and positioning accuracy and driving safety of a vehicle are improved. This solution may be further used to improve a capability of autonomous driving or an advanced driver-assistance system ADAS, may be applied to internet of vehicles, for example, vehicle to everything V2X, long term evolution-vehicle LTE-V, and vehicle-to-vehicle V2V.

Figure 5:
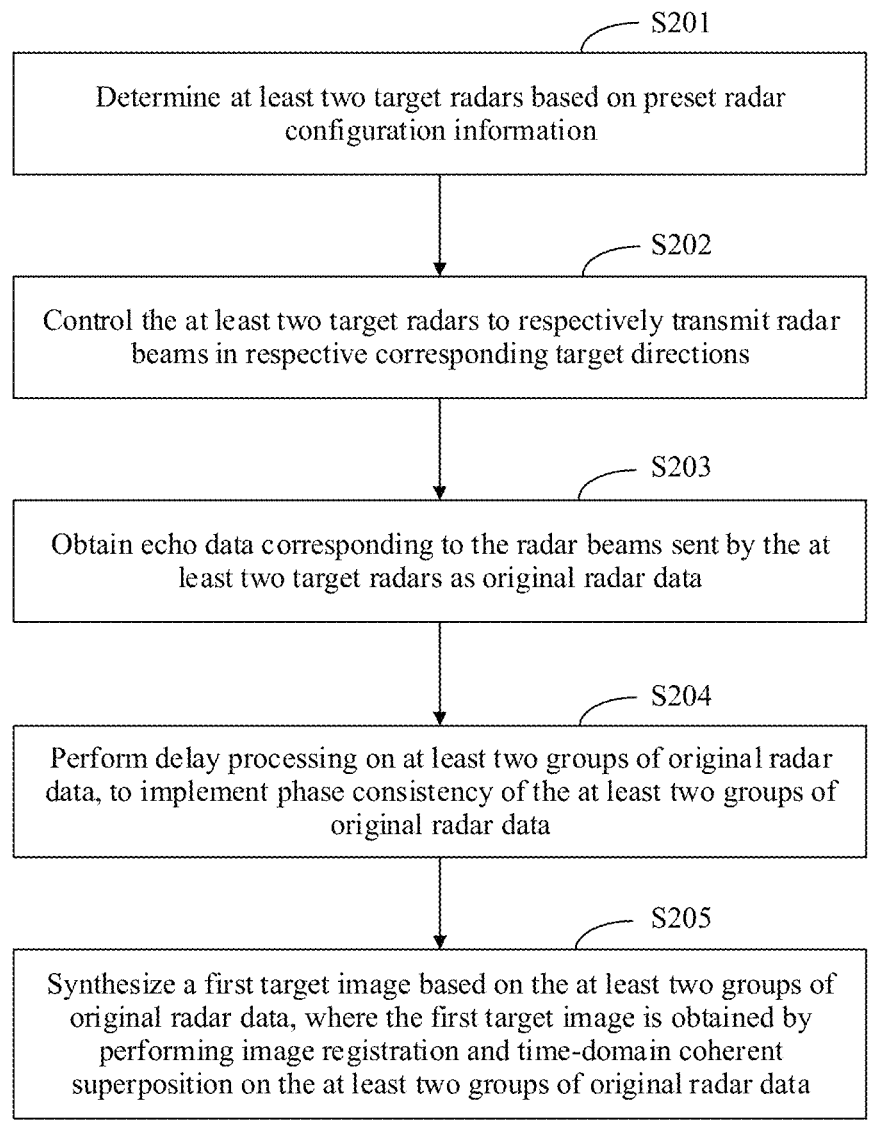
FIG. 5 is a schematic flowchart of another imaging method according to an embodiment of this application.

FIG. 5 is a schematic flowchart of another imaging method according to an embodiment of this application. As shown in FIG. 5, in the imaging method provided in this embodiment, based on the imaging method provided in the embodiment shown in FIG. 3, Step S101 is further refined, and a delay processing step is added after Step S101. The method includes the following steps.

Step S201: Determine at least two target radars based on preset radar configuration information.

For example, the radar configuration information includes at least one of radar identifier information, radar location information, and radar transmission angle information. The radar location information is used to represent a location of a radar, and the radar transmission angle information is used to represent a transmission angle of a radar.

Figure 6:
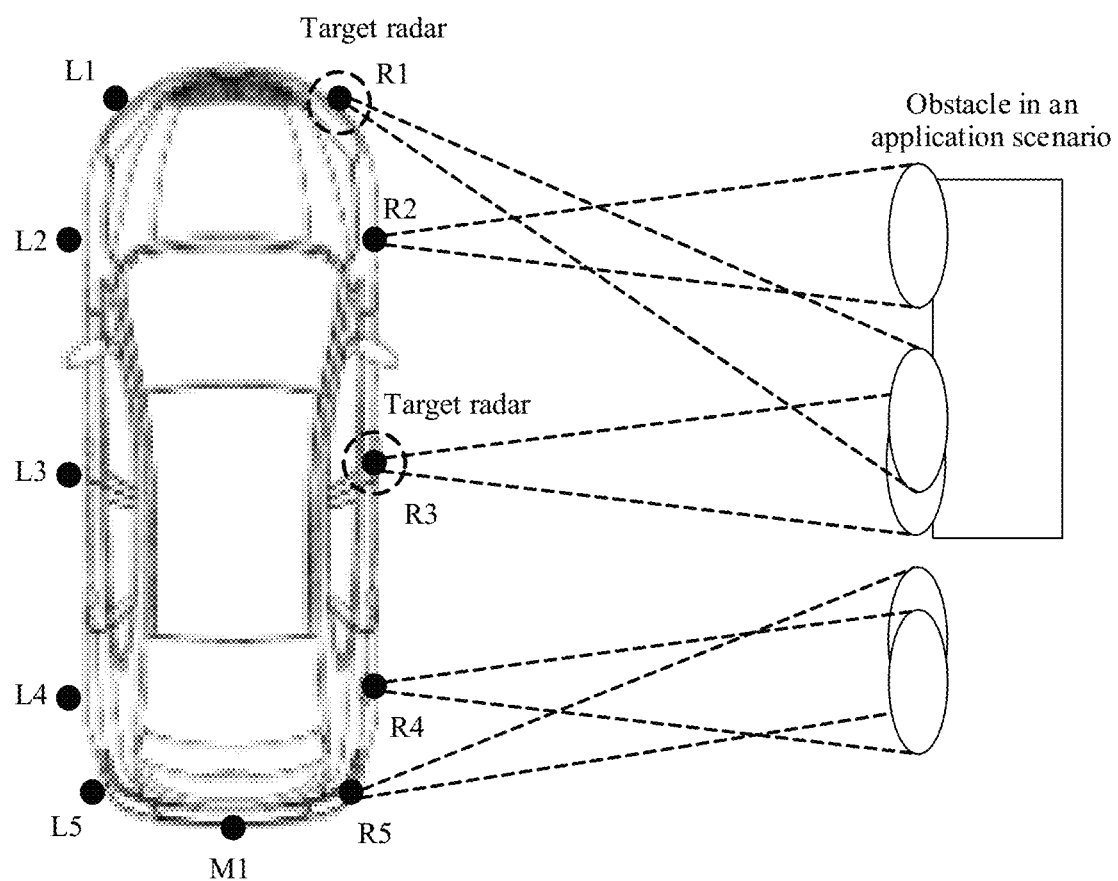
FIG. 6 is a schematic diagram of a target radar according to an embodiment of this application.

Specifically, in a possible implementation, the radar configuration information includes the radar location information and the radar transmission angle information. An execution body of the imaging method provided in this embodiment of this application is, for example, a radar system. The radar system determines, from a plurality of preset synthetic aperture radars based on the radar location information or the radar transmission angle information in the radar configuration information, a target radar suitable for a current application scenario or an application requirement. FIG. 6 is a schematic diagram of a target radar according to an embodiment of this application. As shown in FIG. 6, a target vehicle is provided with a plurality of synthetic aperture radars (which include R1, R2, R3, R4, and R5 on a right side of the vehicle, L1, L2, L3, L4, and L5 on a left side of the vehicle, and M1 on a dead rear side of the vehicle, and when a same example identifier of a synthetic space radar is involved in the following figure, details are not described again). The radar system determines, by using the radar configuration information, the synthetic aperture radars R1 and R3 whose radar locations and radar transmission angles better match the current application scenario as the target radars.

Figure 7:
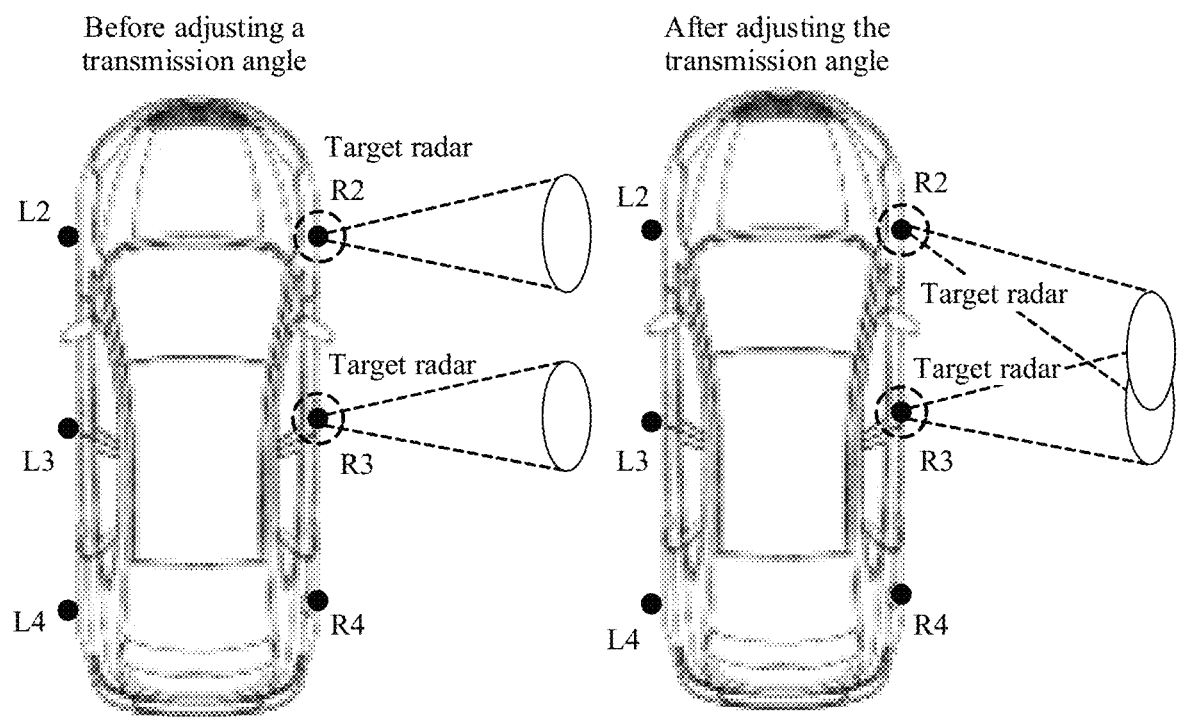
FIG. 7 is a schematic diagram of adjusting a target radar according to an embodiment of this application.

In another possible implementation, the radar configuration information includes the radar location information and the radar transmission angle information. An execution body of the imaging method provided in this embodiment of this application is, for example, a radar system. The radar system adjusts locations and/or transmission angles of some or all of a plurality of preset synthetic aperture radars based on the radar location information or the radar transmission angle information in the radar configuration information, and determines an adjusted synthetic aperture radar as the target radar. FIG. 7 is a schematic diagram of adjusting a target radar according to an embodiment of this application. As shown in FIG. 7, a location and/or a transmission angle of a synthetic aperture radar are/is adjusted, so that a same synthetic aperture radar (for example, R2 and R3 in FIG. 7) can play a role in different application scenarios or application requirements, to reduce a quantity of synthetic aperture radars disposed in a vehicle and reduce costs of the radar system.

In still another possible implementation, the radar configuration information includes the radar identifier information. The radar identifier information is used to represent a mapping relationship between a radar identifier and different radar locations and radar transmission angles. For example, Table 1 is a schematic diagram of the radar identifier information provided in embodiments of this application. As shown in Table 1, in different application scenarios or application requirements, a radar identifier may be determined based on a required radar location and a required radar transmission angle, to determine a target radar corresponding to the radar identifier.

TABLE 1

| Radar identifier | Radar location | Radar transmission angle |
| --- | --- | --- |
| #1 | 40 cm on the left side | 30 degrees |
| #2 | 2200 cm on the left side | 150 degrees |
| #3 | 40 cm on the left side | 30 degrees |
| #4 | 2200 cm on the left side | 150 degrees |

In this application, the radar location information and the transmission angle information are set in the radar configuration information, so that a coverage area of a beam transmitted by a radar can be adjusted, and the radar beam can correspond to an optimal coverage area in different application scenarios and application requirements, to improve use flexibility and an application scope.

Step S202: Control the at least two target radars to respectively transmit radar beams in respective corresponding target directions. Optionally, the target directions of the at least two target radars may be the same or different, or there may be a plurality of target radars in the at least two target radars, and the target directions of the plurality of target radars are different.

Step S203: Obtain echo data corresponding to the radar beams sent by the at least two target radars as the original radar data.

Figure 8:
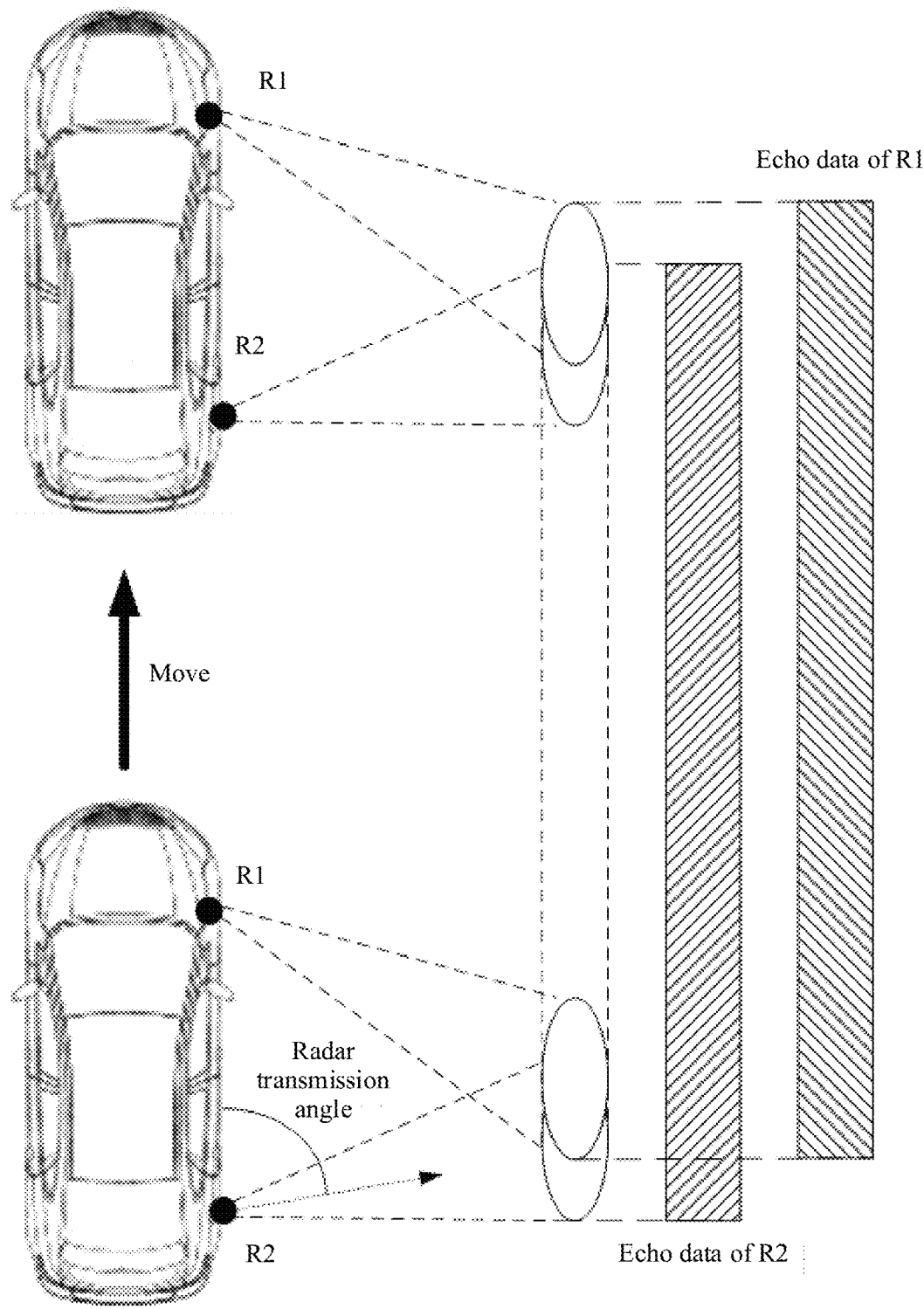
FIG. 8 is a schematic diagram in which a target radar transmits a radar beam in a target direction according to an embodiment of this application.

For example, the at least two target radars have specific radar locations and radar transmission angles, and each target radar transmits a radar beam to a target direction of the target radar at a transmission location of the target radar based on a corresponding radar transmission angle. FIG. 8 is a schematic diagram in which a target radar transmits a radar beam in a target direction according to an embodiment of this application. As shown in FIG. 8, in this embodiment, a radar system includes two synthetic aperture radars (for example, R1 and R2), which are respectively disposed at a vehicle head location and a vehicle tail location on one side of a vehicle. The two synthetic aperture radars transmit radar beams in respective target directions based on respective radar transmission angles. In addition, according to the imaging principle of the synthetic aperture radar, a target vehicle on which the radar system is installed moves along a direction, and a radar beam is continuously sent and reflected by an obstacle, to generate an echo signal. The synthetic aperture radar receives echo information, to obtain echo data. A set of echo data corresponding to different target radars is the original radar data. It can be learned that the original radar data includes environment information that is collected by each target radar and that is used to sense an object in a target area. Compared with radar information collected by a single radar, the original radar data has a larger quantity of information and better accuracy.

Figure 9:
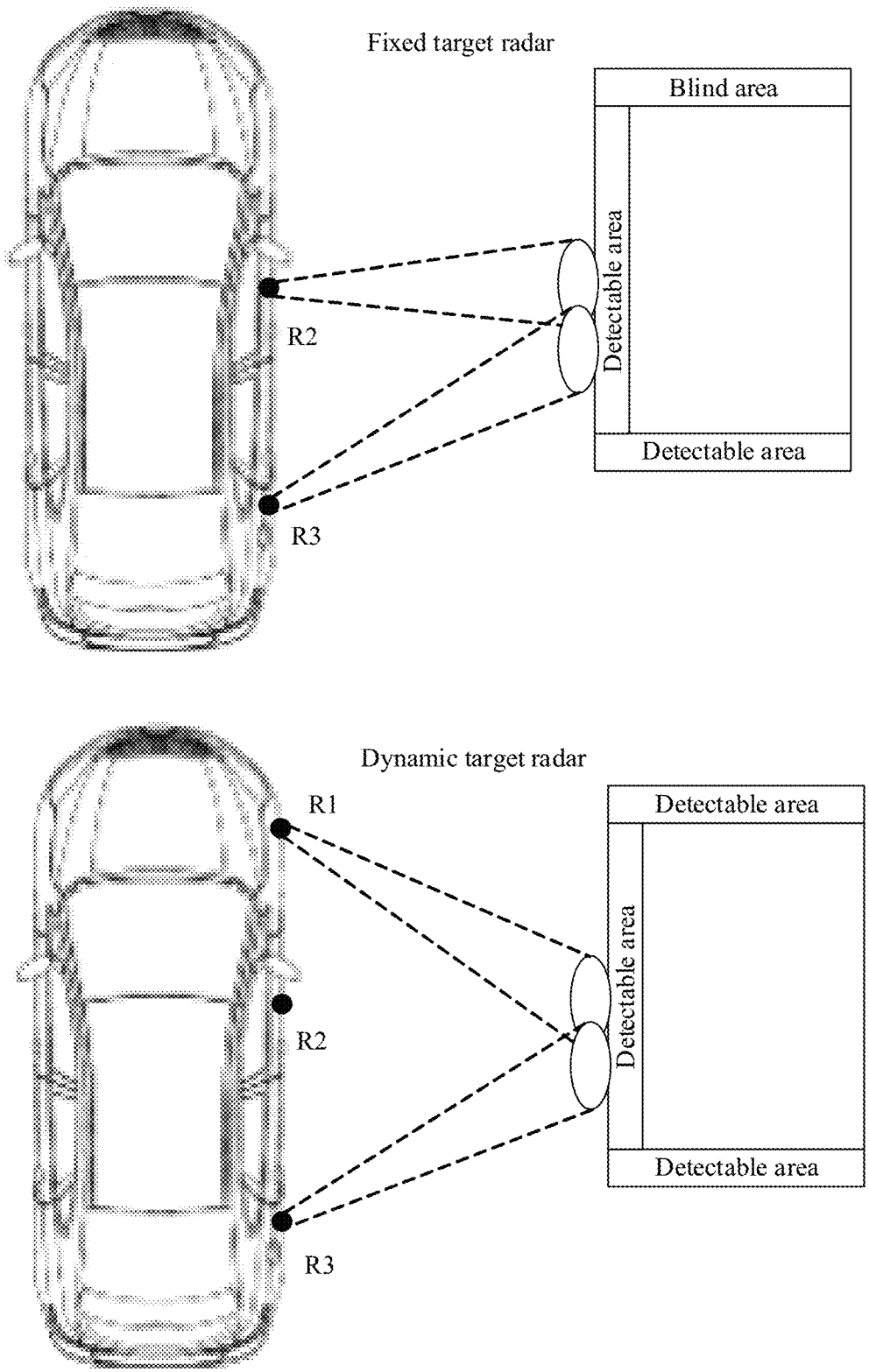
FIG. 9 is a schematic diagram of comparison between a dynamic target radar and a fixed target radar in the conventional technology according to an embodiment of this application.

Further, FIG. 9 is a schematic diagram of comparison between a dynamic target radar and a fixed target radar in the conventional technology according to an embodiment of this application. As shown in FIG. 9, in the conventional technology, target radars (for example, R2 and R3) are preset in advance. When a vehicle moves near an obstacle, because an angle and a distance relationship between the obstacle and the vehicle are uncertain, a fixed radar beam transmission angle forms a blind area for radar detection. However, in the step of determining the target radar provided in this embodiment of this application, target radars (for example, R1 and R3) can be dynamically adjusted based on the preset radar configuration information and a relationship between the radar and the obstacle, so that a radar beam transmission angle of the target radar can match the obstacle, to cover an area in which the obstacle is located to a maximum extent, and improve a radar detection effect. Specifically, the radar configuration information may be adjusted and set based on a specific requirement. For example, different radar configuration information is correspondingly used in a high-speed driving process of a vehicle and in a parking process of a vehicle. In a possible design, the radar configuration information may be radar configuration information that matches an operation instruction and that is correspondingly set after an in-car infotainment system installed in the vehicle receives the operation instruction from a user. In another possible design, a radar system or a control apparatus disposed in the vehicle automatically and dynamically sets the radar configuration information based on a detected obstacle status, so that a radar performs detection by using different location parameters and transmission angle parameters, to improve the radar detection effect. It should be noted that the control apparatus may be any processor, chip system, or device that can be configured to perform a control function in a vehicle. A specific manner of obtaining the radar configuration information is not limited herein, and may be set based on a specific application scenario and a requirement.

In this application, the at least two target radars are determined by using the preset radar configuration information, and the original radar data is obtained by using the at least two target radars. Because the radar configuration information may be adjusted and set based on a specific requirement, an optimal radar that matches a current application scenario or an application requirement, that is, the target radar, may be selected from a plurality of vehicle-mounted radars, to improve use flexibility and an application scope of the radar system.

Step S204: Perform delay processing on the at least two groups of original radar data, to implement phase consistency of the at least two groups of original radar data.

Specifically, because radar locations and/or radar transmission angles of a plurality of target radars are different, there is a phase difference between echo data generated after radar beams transmitted by different target radars are reflected by a target detected object. Therefore, there is an initial phase difference between collected original radar data. To form a seamless connected wide beam by radar beams transmitted by the plurality of target radars, phases of original radar data collected by the plurality of target radars need to be aligned.

Figure 10:
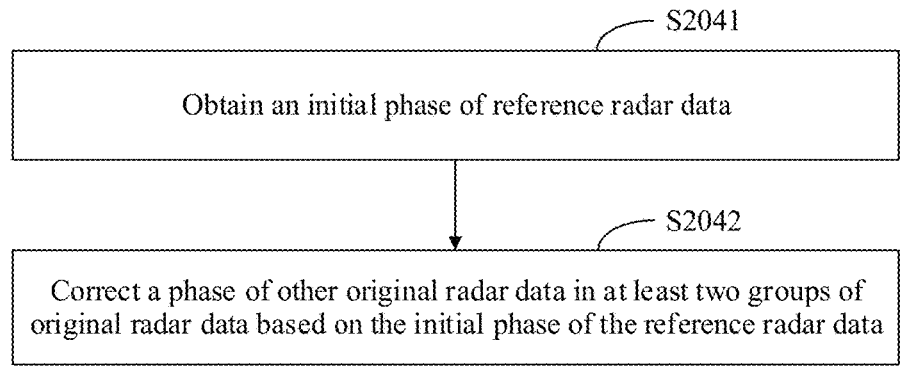
FIG. 10 is a flowchart of an implementation of Step S204 in the embodiment shown in FIG. 5.

For example, as shown in FIG. 10, in a possible implementation, S204 includes two specific implementation steps: S2041 and S2042.

Step S2041: Obtain an initial phase of reference radar data.

Step S2042: Correct a phase of other original radar data in the at least two groups of original radar data based on the initial phase of the reference radar data.

Specifically, the radar beam is a periodic beam signal with a specific frequency. The initial phase of the reference radar data may be obtained by using an entire cycle of the beam signal as a reference. Usually, initial phases of different target radars are different. However, an initial phase difference may be a fixed value. Therefore, phase shift processing may be performed on original radar data of a non-reference radar, to enable initial phases of the plurality of target radars to be consistent. It should be noted that the reference radar data is determined based on the preset configuration information. For example, the reference radar data is determined from a plurality of pieces of original radar data based on the radar configuration information. Compared with other original radar data, the reference radar data can better represent a feature of the target detected object. Therefore, the reference radar data may be understood as radar data with a good detection effect. Therefore, the phase of the other original radar data in the at least two groups of original radar data is adjusted and corrected based on the initial phase of the reference radar data for correction, so that a better phase correction effect can be achieved, and better image precision and accuracy can be obtained when the first target image is subsequently generated by using original radar data corresponding to each target radar.

In this application, delay processing is performed on a plurality of groups of original radar data, so that phases of the plurality of groups of original radar data are aligned. When image superposition is performed subsequently, a better imaging result can be obtained, to improve positioning precision.

Step S205: Synthesize a first target image based on the at least two groups of original radar data, where the first target image is obtained by performing image registration and time-domain coherent superposition on the at least two groups of original radar data.

In this embodiment, an implementation of S205 is the same as an implementation of S102 in the embodiment shown in FIG. 3 of the present invention, and details are not described herein again.

It should be noted that the execution body of the imaging method provided in this embodiment may be the foregoing radar system or a similar radar module, apparatus, or device, or may be a system, a device, or a module, for example, a vehicle advanced intelligent sensing system, an in-car infotainment system, a controller or a chip in a vehicle advanced intelligent sensing system or an in-car infotainment system, or a cloud server. An imaging process performed by the foregoing execution body after obtaining the original radar data is similar, and details for a specific process are not described herein again.

Figure 11:
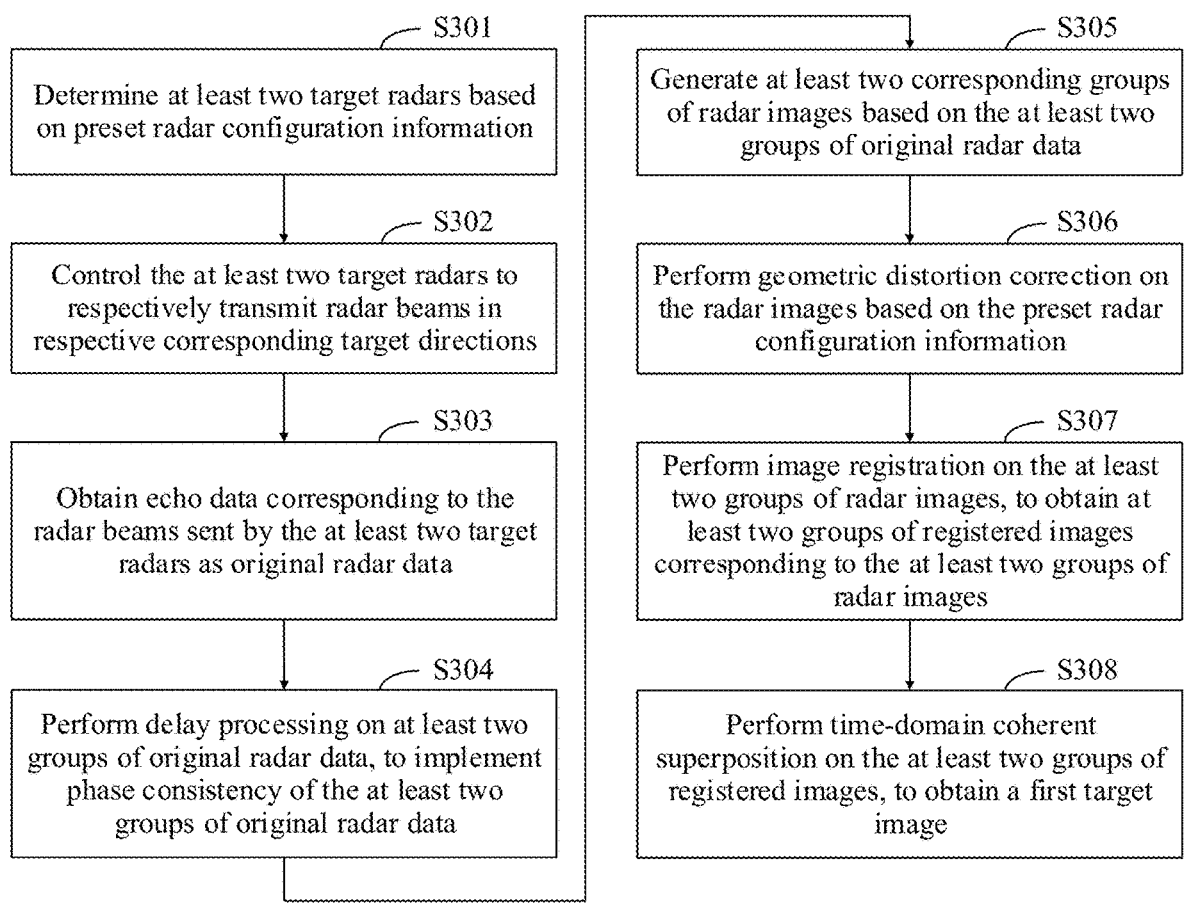
FIG. 11 is a schematic flowchart of still another imaging method according to an embodiment of this application.

FIG. 11 is a schematic flowchart of still another imaging method according to an embodiment of this application. As shown in FIG. 11, in the imaging method provided in this embodiment, based on the imaging method provided in the embodiment shown in FIG. 5, S205 is further refined. The method includes the following steps.

Step S301: Determine at least two target radars based on preset radar configuration information.

Step S302: Control the at least two target radars to respectively transmit radar beams in respective corresponding target directions.

Step S303: Obtain echo data corresponding to the radar beams sent by the at least two target radars as the original radar data.

Step S304: Perform delay processing on the at least two groups of original radar data, to implement phase consistency of the at least two groups of original radar data.

Step S305: Generate at least two corresponding groups of radar images based on the at least two groups of original radar data.

Specifically, after original radar data is obtained by transmitting radar beams in target directions and receiving corresponding echo signals by using at least two synthetic aperture radars, the original radar data is stored in a form of two-dimensional waveform data. Each synthetic aperture radar may independently collect the original radar data. Therefore, according to an existing image synthesis method for a synthetic aperture radar, image processing may be performed on each piece of original radar data, to obtain a radar image corresponding to the original radar data. A specific method for generating a radar image by using radar data is the conventional technology, and details are not described herein.

Step S306: Perform geometric distortion correction on the radar images based on the preset radar configuration information.

For example, the radar configuration information includes at least one of radar identifier information, radar location information, and radar transmission angle information. In a possible implementation, the performing geometric distortion correction on the radar image includes:

obtaining radar image correction information based on the radar configuration information; and performing geometric distortion correction on the radar images based on the radar image correction information.

Specifically, due to factors such as a size and a shape of a target vehicle, a location at which the synthetic aperture radar is disposed in the target vehicle is also different. When the target vehicle is positioned, a center point of the target vehicle is generally used as a reference point. When a body length of the target vehicle is long, or the target radar is far away from the center of the target vehicle, the obtained radar image is distorted due to the impact of a radar beam transmission angle. Therefore, target radars at different locations and transmission angles generate distortion related to the locations and transmission angles of the target radars. The radar image correction information is information used to describe different sizes and shapes of vehicles, and installation locations and transmission angles of radars, and vehicles of different types or vehicles with different radar installation locations and angles have corresponding radar image correction information. The radar image correction information may be used to correct radar images corresponding to target radars at different locations and transmission angles, to eliminate geometric distortion caused by factors, namely, the radar location and the transmission angle from the radar image. Therefore, image information collected by different target radars is consistent, to implement subsequent precise superposition of the image information and improve precision of the first target image.

Step S307: Perform image registration on the at least two groups of radar images, to obtain at least two groups of registered images corresponding to the at least two groups of radar images.

Figure 12:
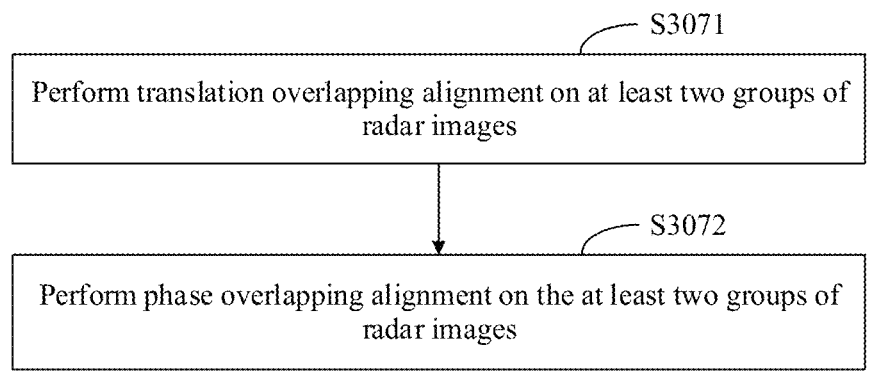
FIG. 12 is a flowchart of an implementation of Step S307 in the embodiment shown in FIG. 11.

For example, as shown in FIG. 12, in a possible implementation, S307 includes two specific implementation steps: S3071 and S3072.

Step S3071: Perform translation overlapping alignment on the at least two groups of radar images.

For example, the following specific steps are included.

First, a reference radar image corresponding to the reference radar data is obtained. The reference radar data is determined, based on the preset configuration information, from original radar data collected by a plurality of target radars. For example, the reference radar data is determined from a plurality of pieces of original radar data based on the radar configuration information. Compared with other original radar data, the reference radar data can better represent a feature of a target detected object. Therefore, the reference radar data may be understood as radar data with a good detection effect. Radar image transformation is performed on the reference radar data, to obtain the corresponding reference radar image. More specifically, for example, a synthetic aperture radar at the head position of the target vehicle is set as the target radar. Correspondingly, original radar data collected by the synthetic aperture radar at the head position of the target vehicle is the reference radar data, and a radar image corresponding to the original radar data is the reference radar image.

Figure 13:
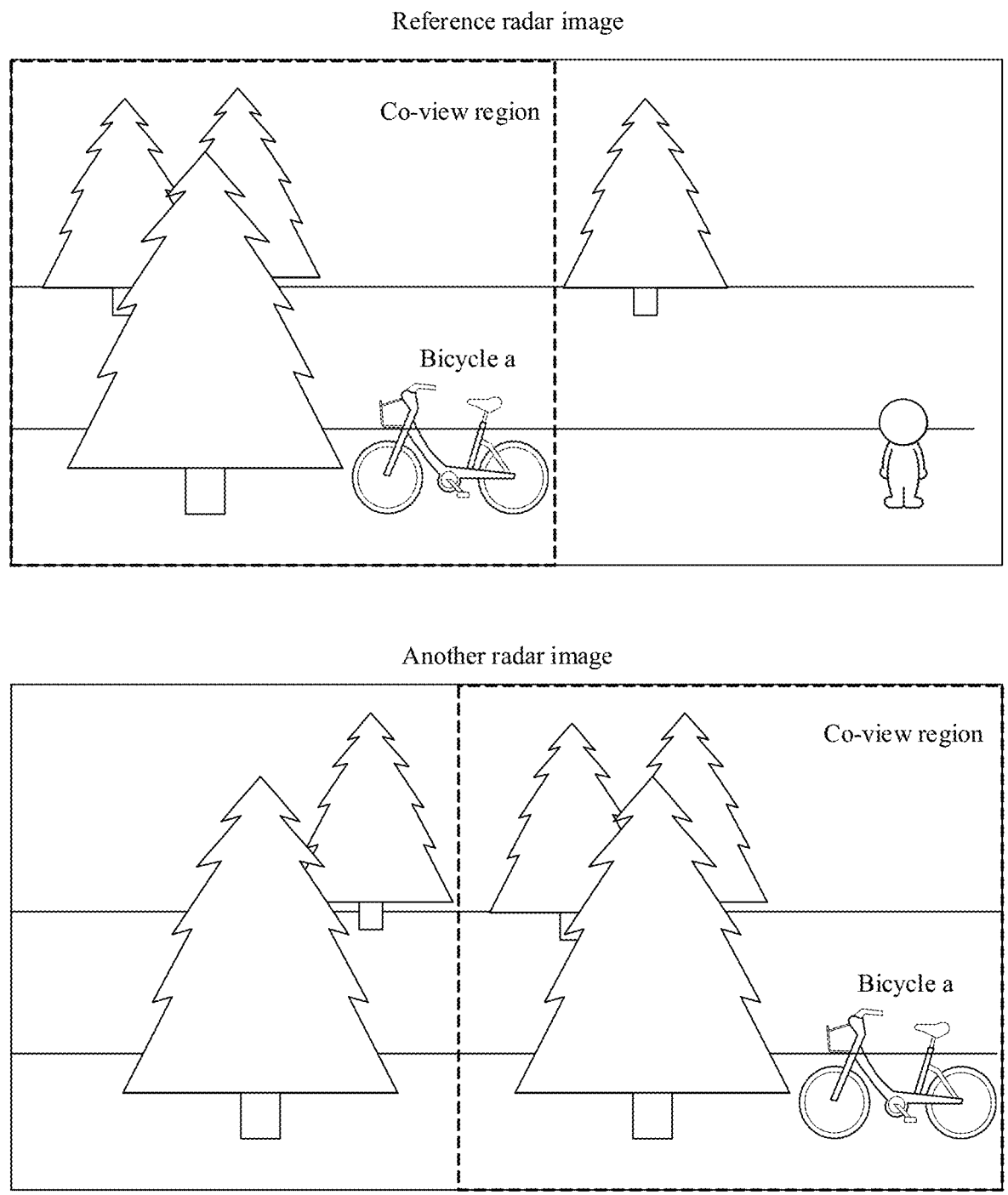
FIG. 13 is a schematic diagram of performing translation overlapping alignment on an image according to an embodiment of this application.

Second, image translation is performed on another radar image in the at least two groups of radar images based on a target element in the reference radar image, to overlap a target element in the another radar image and the target element in the reference radar image For example, FIG. 13 is a schematic diagram of performing translation overlapping alignment on an image according to an embodiment of this application. As shown in FIG. 13, two target radars are used as an example. A target radar A correspondingly generates a reference radar image, and a target radar B correspondingly generates another radar image. The reference radar image and the another radar image have a co-view region, that is, the reference radar image and the another radar image include an overlapping image region, and a target detected object is located in the overlapping image region. There is a target element in the co-view region, for example, a bicycle a shown in FIG. 13. Image translation is performed on the another radar image by using the bicycle a as a reference, to overlap the bicycles "a" in all radar images. In this way, the reference radar image and another radar image obtained after the image translation are used as the registered images.

Step S3072: Perform phase overlapping alignment on the at least two groups of radar images.

For example, the following specific steps are included.

First, phase information in the reference radar image is obtained. The phase information is used to represent an image phase in the reference radar image. To obtain a better superposition effect when coherent superposition is performed on the images, image phases in co-view regions of different radar images need to be aligned. After phase alignment, during coherent superposition, peaks in the radar images can be superimposed and troughs in the radar images can be superimposed, to improve a signal-to-noise ratio and accuracy of the images. Further, the radar image includes phase information, and corresponding phase information may be obtained by parsing the digital radar image. Details are not described herein again.

Second, phase registration is performed on another radar image based on the phase information, to enable a phase of the another radar image in the at least two groups of radar images to be consistent with a phase of the reference radar image, and the reference radar image and another radar image obtained after the phase registration are used as the registered images.

For example, a phase difference between the reference radar image and another radar image may be obtained based on the phase information, and then a phase of the another radar image is adjusted based on the phase difference, to enable the phase of the another radar image to be consistent with the phase of the reference radar image. Specifically, the radar image is formed after a radar beam is processed, and a phase in the radar beam is determined by performing steps such as Fourier transformation. The phase difference is a specific value. The phase of the reference radar image is used as a reference, and the phase of the another radar image is translated by a distance of the phase difference, that is, phase alignment between the another radar image and the reference radar image is implemented. An adjusted radar image is a registered image. An execution body for performing the phase registration process is consistent with an execution body for performing the imaging method provided in this embodiment of this application. For example, the execution body may be a vehicle advanced intelligent sensing system, or a controller or a chip in a vehicle advanced intelligent sensing system, or may be a radar system. Certainly, in a non-vehicle use scenario, the foregoing execution body may be a terminal such as an uncrewed aerial vehicle, an unmanned vehicle, a flight vehicle, or a robot, or a controller or a chip disposed in a terminal.

In this embodiment of this application, in this application, the reference radar image corresponding to the reference radar data is obtained. The reference radar data may be determined by using the radar configuration information or a specific application scenario, and image translation and phase registration are performed on another radar image based on the reference radar image, to generate a registered image. Because the registered images are already aligned in terms of time domain and phase, the registered images may be directly superimposed, to obtain the first target image, so as to improve precision and resolution of the generated first target image.

Step S308: Perform time-domain coherent superposition on the at least two groups of registered images, to obtain the first target image.

For example, the registered image includes a co-view region image and a non-co-view region image, and co-view region images of different registered images overlap with each other.

In a possible implementation, the performing time-domain coherent superposition on the at least two groups of registered images includes:

obtaining co-view region images of the at least two groups of registered images; and performing time-domain superposition on the co-view region images of the at least two groups of registered images, to obtain the first target image.

Figure 14:
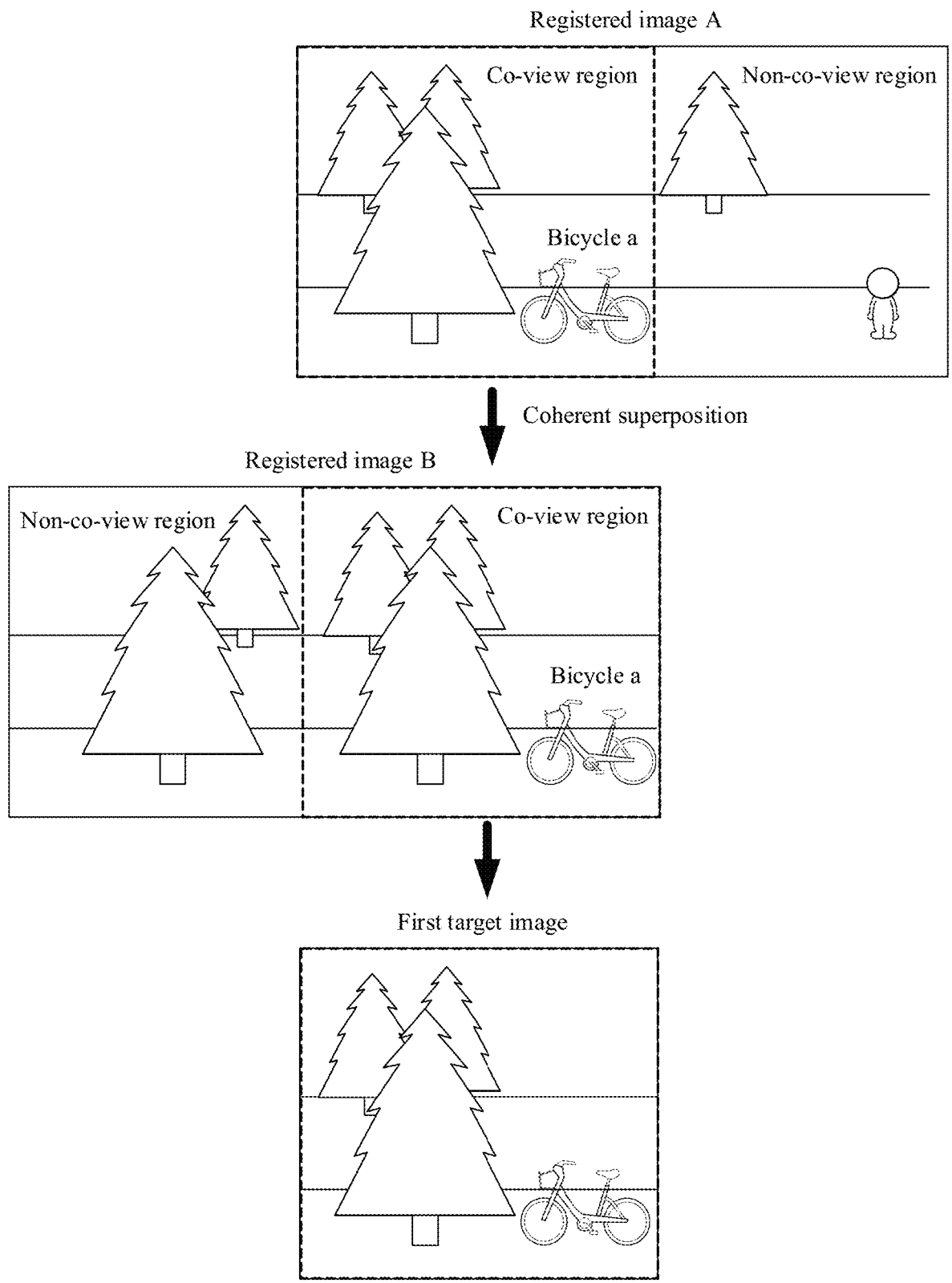
FIG. 14 is a schematic diagram of performing time-domain coherent superposition on registered images according to an embodiment of this application.

FIG. 14 is a schematic diagram of performing time-domain coherent superposition on registered images according to an embodiment of this application. As shown in FIG. 14, two groups of registered images are used as an example. A registered image A and a registered image B have co-view regions. Because the registered image A and the registered image B have been registered in the foregoing steps, and phases and locations of the co-view regions are aligned, the co-view regions of the registered image A and the registered image B may be directly combined and superimposed in time domain, to obtain a first target image. The first target image includes a target detected object. Because coherent superposition is performed, resolution of the first target image is higher than resolution of a radar image generated by a conventional single radar. In addition, due to a mutual alignment process of radar signals between a plurality of radar sources, the generated first target image has better accuracy, to improve safety and stability of a target vehicle in an application scenario, for example, autonomous driving.

In another possible implementation, the performing time-domain coherent superposition on the at least two groups of registered images includes:

obtaining a location relationship between registered images, and splicing non-co-view region images of the at least two groups of registered images on two sides of the first target image based on the location relationship between the registered images, to obtain a second target image.

Figure 15:
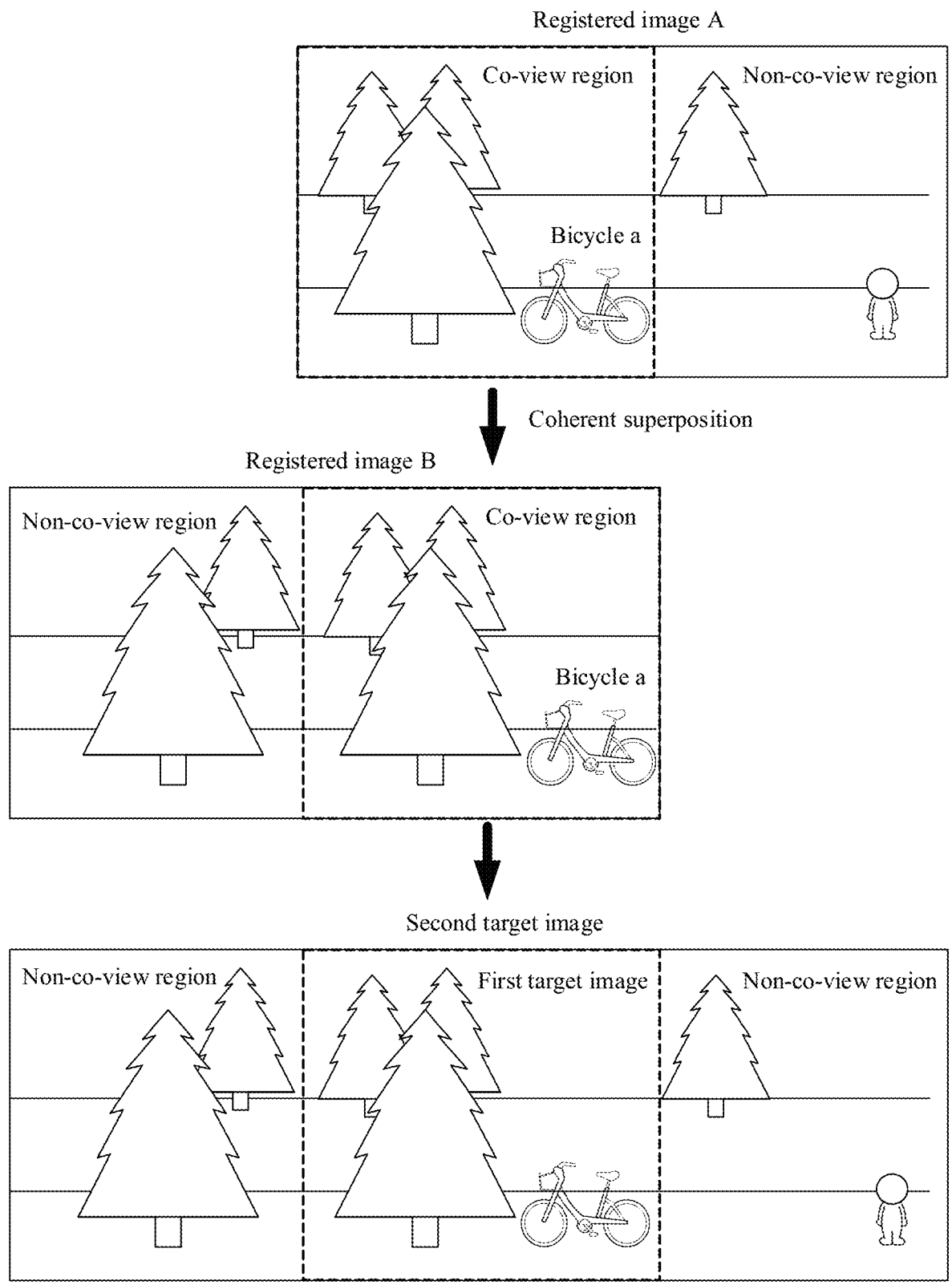
FIG. 15 is another schematic diagram of performing time-domain coherent superposition on registered images according to an embodiment of this application.

FIG. 15 is another schematic diagram of performing time-domain coherent superposition on registered images according to an embodiment of this application. As shown in FIG. 15, two groups of registered images are used as an example. A registered image A and a registered image B have co-view regions and non-co-view regions. After coherent superposition is performed on the co-view regions to obtain a first target image, non-co-view region images of the registered image A and the registered image B are spliced on two sides of the first target image. Because the registered images are obtained after data collected by different radars is processed, non-co-view regions of the registered images include different image information. Non-co-view region images of different registered images are spliced, so that the obtained second target image has a wider field of view and richer detection information, to further improve safety and stability of a target vehicle in an application scenario, for example, autonomous driving.

Certainly, it may be understood that, when there are more than two groups of registered images, co-view regions and non-co-view regions that are formed by a plurality of different registered images may appear. In this case, the co-view regions may be separately processed according to the method in the embodiment shown in FIG. 14, and the non-co-view regions may be spliced on two sides of different co-view regions according to the method in the embodiment shown in FIG. 15, to form the second target image.

In this embodiment, an implementation of S301 to S304 is the same as the implementation of S201 to S204 in the embodiment shown in FIG. 5 of the present invention, and details are not described herein.

The foregoing describes in detail the imaging method in embodiments of this application, and the following describes an imaging apparatus in embodiments of this application.

Figure 16:
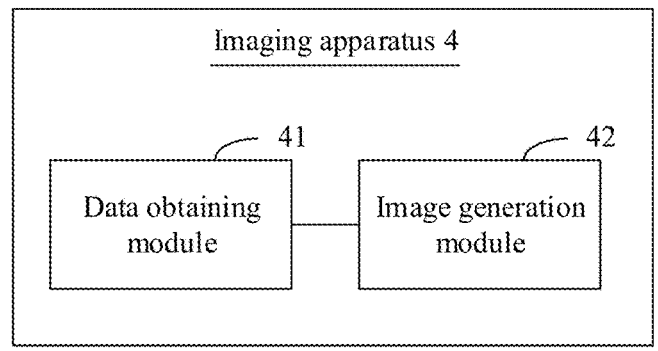
FIG. 16 is a schematic block diagram of an imaging apparatus according to an embodiment of this application.

In an example, FIG. 16 is a schematic block diagram of an imaging apparatus according to an embodiment of this application. The imaging apparatus 4 in this embodiment of this application may be the radar system, the in-car infotainment system, or the vehicle advanced intelligent sensing system in the foregoing method embodiments, or may be one or more chips in the radar system, the in-car infotainment system, or the vehicle advanced intelligent sensing system. The imaging apparatus 4 may be configured to implement some or all functions of the imaging method in the foregoing method embodiments. The imaging apparatus 4 may include the following modules.

A data obtaining module 41 is configured to obtain at least two groups of original radar data, where the at least two groups of original radar data are from at least two radars. The data obtaining module 41 may perform Step S101 of the method shown in FIG. 3.

An image generation module 42 is configured to synthesize a first target image based on the at least two groups of original radar data, where the first target image is obtained by performing image registration and time-domain coherent superposition on the at least two groups of original radar data. The image generation module 42 may perform Step S102 of the method shown in FIG. 3, or may perform Step S205 of the method shown in FIG. 5.

The imaging apparatus 4 in the embodiment shown in FIG. 16 may be configured to implement the technical solution of the method in the embodiment shown in FIG. 3, and an implementation principle and a technical effect thereof are similar to those of the method, and details are not described herein again.

Figure 17:
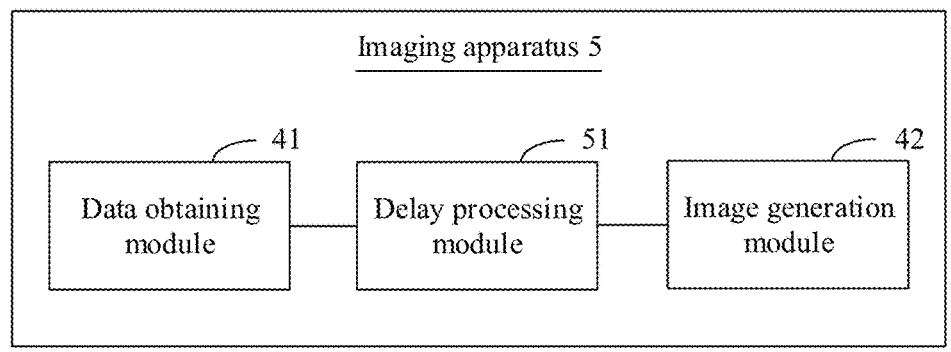
FIG. 17 is a schematic block diagram of another imaging apparatus according to an embodiment of this application.

In an example, FIG. 17 is a schematic block diagram of another imaging apparatus according to an embodiment of this application. As shown in FIG. 17, based on the imaging apparatus 4 shown in FIG. 16, a delay processing module 51 is added to the imaging apparatus 5 provided in this embodiment of this application.

The data obtaining module 41 is specifically configured to: determine at least two target radars based on preset radar configuration information; control the at least two target radars to respectively transmit radar beams in respective corresponding target directions; and obtain echo data corresponding to the radar beams sent by the at least two target radars as the original radar data. In this case, the data obtaining module 41 may perform Step S201 to Step S203 of the method shown in FIG. 5, or perform Step S301 to Step S303 of the method shown in FIG. 11.

For example, the radar configuration information includes at least one of radar identifier information, radar location information, and radar transmission angle information. The radar location information is used to represent a location of a radar, and the radar transmission angle information is used to represent a transmission angle of a radar.

For example, the imaging apparatus further includes the delay processing module 51, configured to perform delay processing on the at least two groups of original radar data, to implement phase consistency of the at least two groups of original radar data. In this case, the delay processing module 51 may perform Step 204 of the method shown in FIG. 5 or perform Step 304 of the method shown in FIG. 11.

For example, the delay processing module 51 is specifically configured to: obtain an initial phase of reference radar data; and correct a phase of other original radar data in the at least two groups of original radar data based on the initial phase of the reference radar data. In this case, the delay processing module 51 may perform Step S2041 and Step S2042 of the method shown in FIG. 10.

The imaging apparatus 5 in the embodiment shown in FIG. 17 may be configured to implement the technical solution of the method in the embodiment shown in FIG. 3 or FIG. 5, and an implementation principle and a technical effect thereof are similar to those of the method, and details are not described herein again.

In addition, implementation of this embodiment does not depend on whether the embodiment shown in FIG. 16 is implemented, and this embodiment may be independently implemented.

Figure 18:
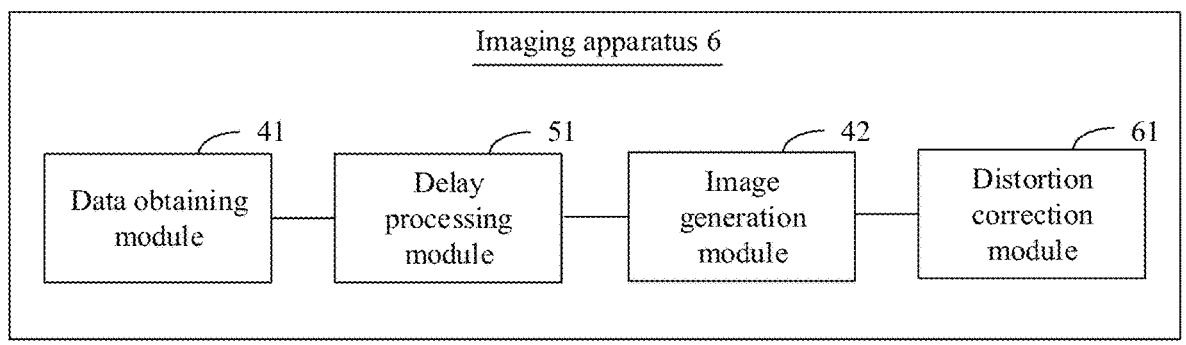
FIG. 18 is a schematic block diagram of still another imaging apparatus according to an embodiment of this application.

In an example, FIG. 18 is a schematic block diagram of still another imaging apparatus according to an embodiment of this application. As shown in FIG. 18, based on the apparatus 5 shown in FIG. 17, a distortion correction module 61 is added to the imaging apparatus 6 provided in this embodiment of this application.

For example, the image generation module 42 is specifically configured to: generate at least two corresponding groups of radar images based on the at least two groups of original radar data; perform image registration on the at least two groups of radar images, to obtain at least two groups of registered images corresponding to the at least two groups of radar images; and perform time-domain coherent superposition on the at least two groups of registered images, to obtain the first target image. In this case, the image generation module 42 may perform Step S305, Step S307, and Step S308 of the method shown in FIG. 11.

For example, the distortion correction module 61 is configured to: obtain preset radar configuration information; and perform geometric distortion correction on the radar images based on the radar configuration information. In this case, the distortion correction module 61 may perform Step S306 of the method shown in FIG. 11.

For example, the radar configuration information includes at least one of radar identifier information, radar location information, and radar transmission angle information; and when performing geometric distortion correction on the radar images based on the radar configuration information, the distortion correction module 61 is specifically configured to: obtain radar image correction information based on the radar configuration information; and perform geometric distortion correction on the radar images based on the radar image correction information. In this case, the distortion correction module 61 may perform Step S306 of the method shown in FIG. 11.

For example, the at least two groups of original radar data include one group of reference radar data; and when performing image registration on the at least two groups of radar images, to obtain at least two groups of registered images corresponding to the at least two groups of radar images, the image generation module 42 is specifically configured to: obtain a reference radar image corresponding to the reference radar data; perform image translation on another radar image in the at least two groups of radar images based on a target element in the reference radar image, to overlap a target element in the another radar image and the target element in the reference radar image; and use the reference radar image and another radar image obtained after the image translation as the registered images. In this case, the image generation module 42 may perform Step S3071 of the method shown in FIG. 11.

For example, after performing image translation on another radar image in the at least two groups of radar images based on a target element in the reference radar image, to overlap a target element in the another radar image and the target element in the reference radar image, the image generation module 42 is specifically configured to: obtain phase information in the reference radar image; perform phase registration on another radar image based on the phase information, to enable a phase of the another radar image in the at least two groups of radar images to be consistent with a phase of the reference radar image; and use the reference radar image and another radar image obtained after the phase registration as the registered images. In this case, the image generation module 42 may perform Step S3072 of the method shown in FIG. 11.

For example, the registered image includes a co-view region image and a non-co-view region image, and co-view region images of different registered images overlap with each other; and when performing time-domain coherent superposition on the at least two groups of registered images, to obtain the first target image, the image generation module 42 is specifically configured to: obtain co-view region images of the at least two groups of registered images; and perform time-domain superposition on the co-view region images of the at least two groups of registered images, to obtain the first target image. In this case, the image generation module 42 may perform Step S308 of the method shown in FIG. 11.

For example, after obtaining the first target image, the image generation module 42 is specifically configured to obtain a location relationship between the registered images, and splice non-co-view region images of the at least two groups of registered images on two sides of the first target image based on the location relationship between the registered images, to obtain a second target image. In this case, the image generation module 42 may perform Step S308 of the method shown in FIG. 11.

The imaging apparatus 6 in the embodiment shown in FIG. 18 may be configured to implement the technical solution of the method in the embodiment shown in FIG. 3, FIG. 5, or FIG. 11, and an implementation principle and a technical effect thereof are similar to those of the method, and details are not described herein again.

In addition, implementation of this embodiment does not depend on whether the embodiment shown in FIG. 17 is implemented, and this embodiment may be independently implemented.

Figure 19:
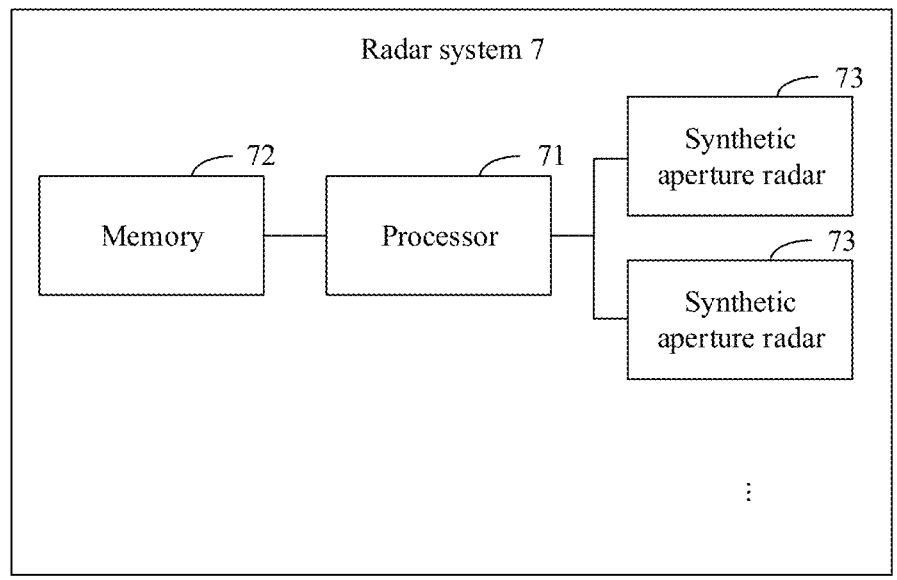
FIG. 19 is a schematic block diagram of a structure of a radar system according to an embodiment of this application.

FIG. 19 is a schematic block diagram of a structure of a radar system according to an embodiment of this application. As shown in FIG. 19, the radar system 7 includes a processor 71, a memory 72, and at least two synthetic aperture radars 73. The processor 71 is configured to control the synthetic aperture radar 73 to receive and send a signal. The memory 72 is configured to store a computer program. The processor 71 is further configured to invoke and run the computer program stored in the memory 72, so that the radar system 7 performs steps of the method shown in FIG. 3, or steps of the method shown in FIG. 5, or steps of the method shown in FIG. 11. The processor 17 may be further configured to implement the modules in FIG. 16 to FIG. 18.

Figure 20:
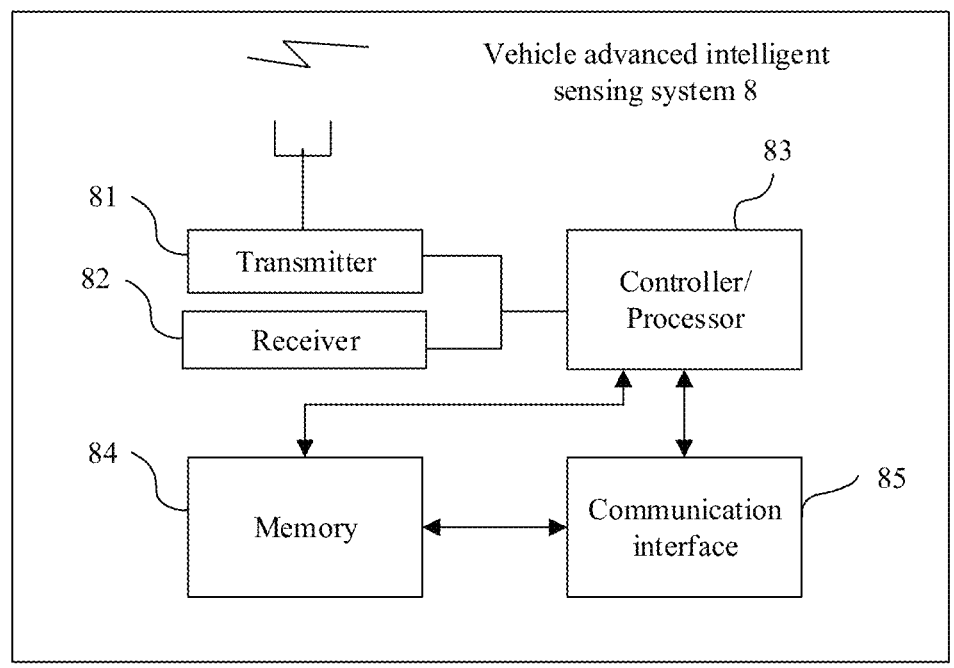
FIG. 20 is a schematic block diagram of a structure of a vehicle advanced intelligent sensing system according to an embodiment of this application.

FIG. 20 is a schematic block diagram of a structure of a vehicle advanced intelligent sensing system according to an embodiment of this application. As shown in FIG. 20, the vehicle advanced intelligent sensing system 8 includes a transmitter 81, a receiver 82, and a processor 83.

The processor 83 is configured to perform the steps in FIG. 3. Alternatively, the processor 83 is configured to perform the steps in FIG. 5. Alternatively, the processor 83 is configured to perform the steps in FIG. 11. The processor 83 is configured to implement the modules in FIG. 16, FIG. 17, and FIG. 18.

The vehicle advanced intelligent sensing system 8 in the embodiment shown in FIG. 20 may be configured to perform the technical solution in the foregoing method embodiments, or program of each module in the embodiments shown in FIG. 16, FIG. 17, and FIG. 18. The processor 83 invokes the program to perform operations in the foregoing method embodiments, to implement each module shown in FIG. 16, FIG. 17, and FIG. 18.

The processor 83 may alternatively be a controller, and is represented as "controller/processor 83" in FIG. 20. The transmitter 81 and the receiver 82 are configured to: support information receiving and sending between the vehicle advanced intelligent sensing system 8 and each device in the target vehicle in the foregoing embodiments, and support communication between the vehicle advanced intelligent sensing system 8 and each device in the target vehicle in the foregoing embodiments.

Further, the network device may further include a memory 84, and the memory 84 is configured to store program code and data of the vehicle advanced intelligent sensing system 8. Further, the vehicle advanced intelligent sensing system may further include a communication interface 85.

The processor 83 may be, for example, a central processing unit (CPU), or may be one or more integrated circuits configured to implement the foregoing methods, for example, one or more application-specific integrated circuits (ASICs), one or more microprocessors (digital signal processors, DSPs), or one or more field programmable gate arrays (FPGAs). The memory 84 may be a memory, or may be a collective name of a plurality of storage elements.

It should be noted that, in the vehicle advanced intelligent sensing system 8 in FIG. 20 provided in this embodiment of this application, the transmitter 81 may perform a sending action corresponding to the foregoing method embodiments, the processor 83 performs a processing action, and the receiver 82 may perform a receiving action. For details, refer to the foregoing method embodiments.

Figure 21:
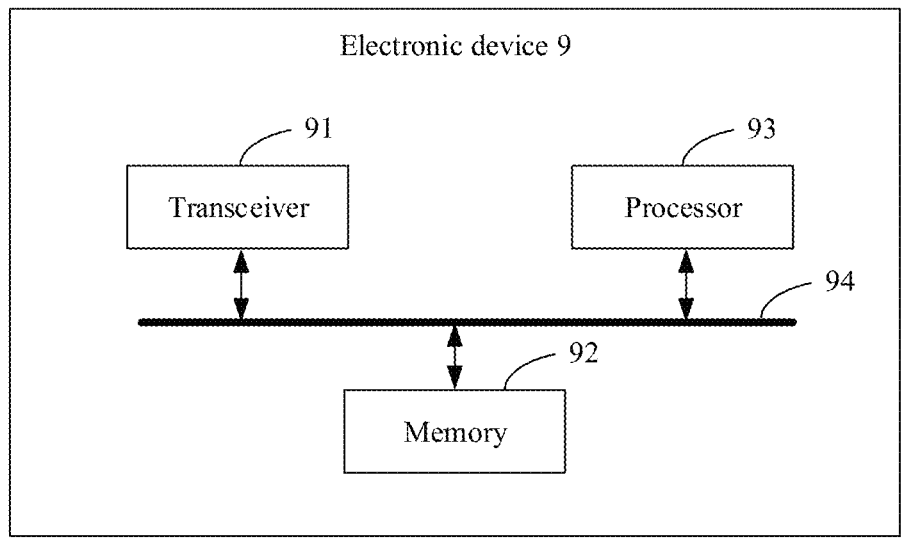
FIG. 21 is a schematic block diagram of a structure of an electronic device according to an embodiment of this application.

FIG. 21 is a schematic block diagram of a structure of an electronic device according to an embodiment of this application. As shown in FIG. 21, the electronic device 9 provided in this embodiment includes a transceiver 91, a memory 92, a processor 93, and a computer program.

The processor 93 is configured to control the transceiver 91 to receive and send a signal. The computer program is stored in the memory 92, and is configured to be executed by the processor 93, to implement the method provided in any one of the implementations corresponding to FIG. 3 to FIG. 15 in the present invention.

The transceiver 91, the memory 92, and the processor 93 are connected through a bus 94.

For related descriptions, refer to related descriptions and effects corresponding to the steps in the embodiments corresponding to FIG. 3 to FIG. 15. Details are not described herein again.

Figure 22:
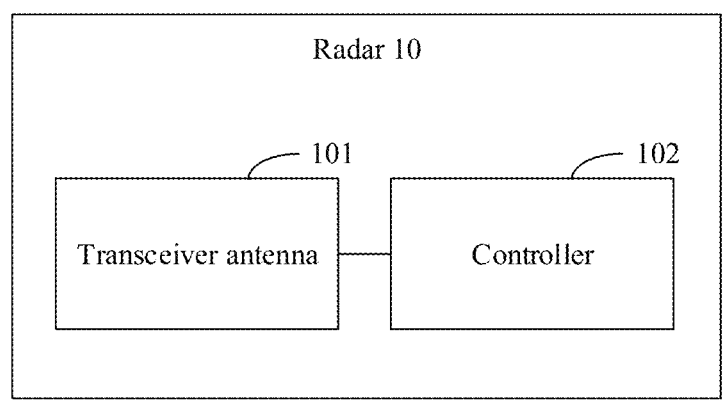
FIG. 22 is a schematic block diagram of a structure of a radar according to an embodiment of this application.

FIG. 22 is a schematic block diagram of a structure of a radar according to an embodiment of this application. As shown in FIG. 22, the radar 10 provided in this embodiment includes a transceiver antenna 101 and a controller 102. The transceiver antenna 101 is configured to receive and send a radar signal. The controller 102 is configured to perform signal processing or control, for example, communication with at least one other radar 10, and control the transceiver antenna to receive and/or send a radar signal. The radar 10 may perform technical solutions in the method embodiments corresponding to FIG. 3 to FIG. 15, or programs of the modules in the embodiments shown in FIG. 16, FIG. 17, and FIG. 18. Specifically, the controller 102 invokes the program to perform operations in the foregoing method embodiments, to implement the modules shown in FIG. 16, FIG. 17, and FIG. 18. Specifically, the transceiver antenna may include at least one independent receive antenna and at least one independent transmit antenna, or may include an antenna array. The controller may include at least one processor. For explanations of the processor, refer to the foregoing explanations of the processor 83. From a perspective of a hardware structure of the radar, the radar may further include another circuit structure, for example, at least one of an oscillator and a frequency mixer.

For related descriptions, refer to related descriptions and effects corresponding to the steps in the embodiments corresponding to FIG. 3 to FIG. 15. Details are not described herein again.

An embodiment of this application further provides a computer-readable storage medium, including computer code. When the computer code is run on a computer, the computer is enabled to perform the method provided in any one of the implementations corresponding to FIG. 3 to FIG. 15.

An embodiment of this application further provides a computer program product, including program code. When a computer runs the computer program product, the program code performs the method provided in any one of the implementations corresponding to FIG. 3 to FIG. 15.

An embodiment of this application further provides a chip, including a processor. The processor is configured to invoke and run a computer program stored in a memory, to perform a corresponding operation and/or procedure performed by a radar system in the imaging method provided in any one of the implementations corresponding to FIG. 3 to FIG. 15. Optionally, the chip further includes the memory. The memory is connected to the processor through a circuit or a wire. The processor is configured to read and execute the computer program in the memory. Further, optionally, the chip further includes a communication interface, and the processor is connected to the communication interface. The communication interface is configured to receive data and/or information that needs to be processed. The processor obtains the data and/or the information from the communication interface, and processes the data and/or the information. The communication interface may be an input/output interface. All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instruction is loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

An embodiment of this application further provides a terminal. The terminal may be an uncrewed aerial vehicle, an unmanned transport vehicle, a vehicle, a flight vehicle, a robot, or the like. The terminal includes the modules shown in FIG. 16 to FIG. 18, or includes an apparatus that can implement the modules shown in FIG. 16 to FIG. 18, or includes the radar system provided in the embodiment shown in FIG. 19. The terminal can perform, by using the modules shown in FIG. 16 to FIG. 18, or including an apparatus that can implement the modules shown in FIG. 16 to FIG. 18, or including the radar system provided in the embodiment shown in FIG. 19, the imaging method provided in any one of the implementations corresponding to FIG. 3 to FIG. 15. In a possible implementation, the terminal includes the foregoing computer-readable storage medium.

A person skilled in the art should be aware that in the foregoing one or more examples, functions described in embodiments of this application may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a general-purpose or a dedicated computer.

What is claimed is:

1. An imaging method applied to an electronic device, wherein the method comprises:
   obtaining at least two groups of original radar data, wherein the at least two groups of original radar data are from at least two radars;
   synthesizing a first target image based on the at least two groups of original radar data, wherein synthesizing the first target image comprises:
      generating at least two corresponding groups of radar images based on the at least two groups of original radar data;
      performing image registration on the at least two groups of radar images, to obtain at least two groups of registered images corresponding to the at least two groups of radar images, wherein the registered image comprises a co-view region image and a non-co-view region image, and co-view region images of different registered images overlap with each other; and
      performing time-domain coherent superposition on the at least two groups of registered images, to obtain the first target image, wherein performing the time-domain coherent superposition to obtain the first target image comprises:
         obtaining co-view region images of the at least two groups of registered images; and
         performing time-domain superposition on the co-view region images of the at least two groups of registered images, to obtain the first target image:
   after the first target image is obtained, obtaining a location relationship between the registered images; and
   splicing non-co-view region images of the at least two groups of registered images on two sides of the first target image based on the location relationship between the registered images, to obtain a second target image.

2. The method according to claim 1, wherein the obtaining the at least two groups of original radar data comprises:
   determining at least two target radars based on preset radar configuration information;
   controlling the at least two target radars to respectively transmit radar beams in respective corresponding target directions; and
   obtaining echo data corresponding to the radar beams sent by the at least two target radars as the original radar data.

3. The method according to claim 2, wherein the radar configuration information comprises at least one of radar identifier information, radar location information, and radar transmission angle information,
   wherein the radar location information represents a location of a radar, and the radar transmission angle information represents a transmission angle of a radar.

4. The method according to claim 1, wherein after obtaining the at least two groups of original radar data, the method further comprises:
   performing delay processing on the at least two groups of original radar data, to implement phase consistency of the at least two groups of original radar data.

5. The method according to claim 4, wherein the at least two groups of original radar data comprise one group of reference radar data; and wherein the performing the delay processing on the at least two groups of original radar data, to implement the phase consistency of the at least two groups of original radar data comprises:
obtaining an initial phase of the reference radar data; and
correcting a phase of other original radar data in the at least two groups of original radar data based on the initial phase of the reference radar data.

6. The method according to claim 1, wherein after generating the at least two corresponding groups of radar images based on the at least two groups of original radar data, the method further comprises:
obtaining preset radar configuration information; and
performing geometric distortion correction on the radar images based on the radar configuration information.

7. The method according to claim 6, wherein the radar configuration information comprises at least one of radar identifier information, radar location information, and radar transmission angle information; and
wherein the performing the geometric distortion correction on the radar images based on the radar configuration information comprises:
obtaining radar image correction information based on the radar configuration information; and
performing geometric distortion correction on the radar images based on the radar image correction information.

8. The method according to claim 1, wherein the at least two groups of original radar data comprise one group of reference radar data; and
wherein the performing the image registration on the at least two groups of radar images, to obtain the at least two groups of registered images corresponding to the at least two groups of radar images comprises:
obtaining a reference radar image corresponding to the reference radar data;
performing image translation on another radar image in the at least two groups of radar images based on a target element in the reference radar image, to overlap a target element in the another radar image and the target element in the reference radar image; and
using the reference radar image and another radar image obtained after the image translation as the registered images.

9. The method according to claim 8, wherein after performing the image translation on the another radar image in the at least two groups of radar images, the method further comprises:
obtaining phase information in the reference radar image;
performing phase registration on the another radar image based on the phase information, to enable a phase of the another radar image in the at least two groups of radar images to be consistent with a phase of the reference radar image; and
using the reference radar image and the another radar image obtained after the phase registration as the registered images.

10. An apparatus, comprising:
a memory configured to store instructions; and
a processor coupled to the memory and configured to execute the instructions to cause the apparatus to:
obtain at least two groups of original radar data, wherein the at least two groups of original radar data are from at least two radars;
synthesize a first target image based on the at least two groups of original radar data, wherein synthesizing the first target image comprises:

generating at least two corresponding groups of radar images based on the at least two groups of original radar data;
performing image registration on the at least two groups of radar images, to obtain at least two groups of registered images corresponding to the at least two groups of radar images, wherein the registered image comprises a co-view region image and a non-co-view region image, and co-view region images of different registered images overlap with each other; and
performing time-domain coherent superposition on the at least two groups of registered images, to obtain the first target image, wherein performing the time-domain coherent superposition to obtain the first target image comprises:
obtaining co-view region images of the at least two groups of registered images; and
performing time-domain superposition on the co-view region images of the at least two groups of registered images, to obtain the first target image;
after the first target image is obtained, obtaining a location relationship between the registered images; and
splicing non-co-view region images of the at least two groups of registered images on two sides of the first target image based on the location relationship between the registered images, to obtain a second target image.

11. The apparatus according to claim 10, wherein the obtaining the at least two groups of original radar data comprises:
determining at least two target radars based on preset radar configuration information;
controlling the at least two target radars to respectively transmit radar beams in respective corresponding target directions; and
obtaining echo data corresponding to the radar beams sent by the at least two target radars as the original radar data.

12. The apparatus according to claim 11, wherein the radar configuration information comprises at least one of radar identifier information, radar location information, and radar transmission angle information,
wherein the radar location information represents a location of a radar, and the radar transmission angle information represents a transmission angle of a radar.

13. The apparatus according to claim 10, wherein after obtaining the at least two groups of original radar data, the processor is further configured to execute the instructions to cause the apparatus to:
perform delay processing on the at least two groups of original radar data, to implement phase consistency of the at least two groups of original radar data.

14. The apparatus according to claim 13, wherein the at least two groups of original radar data comprise one group of reference radar data; and
wherein the performing the delay processing on the at least two groups of original radar data, to implement the phase consistency of the at least two groups of original radar data comprises:
obtaining an initial phase of the reference radar data; and
correcting a phase of other original radar data in the at least two groups of original radar data based on the initial phase of the reference radar data.

15. The apparatus according to claim 10, wherein after generating the at least two corresponding groups of radar images based on the at least two groups of original radar data, the processor is further configured to execute the instructions to cause the apparatus to:

obtain preset radar configuration information; and perform geometric distortion correction on the radar images based on the radar configuration information.

16. The apparatus according to claim 15, wherein the radar configuration information comprises at least one of radar identifier information, radar location information, and radar transmission angle information; and wherein the performing the geometric distortion correction on the radar images based on the radar configuration information comprises:

obtaining radar image correction information based on the radar configuration information; and performing geometric distortion correction on the radar images based on the radar image correction information.

17. The apparatus according to claim 10, wherein the at least two groups of original radar data comprise one group of reference radar data; and wherein the performing the image registration on the at least two groups of radar images, to obtain the at least two groups of registered images corresponding to the at least two groups of radar images comprises:

obtaining a reference radar image corresponding to the reference radar data;

performing image translation on another radar image in the at least two groups of radar images based on a target element in the reference radar image, to overlap a target element in the another radar image and the target element in the reference radar image; and using the reference radar image and another radar image obtained after the image translation as the registered images.

18. The apparatus according to claim 17, wherein after performing the image translation on the another radar image in the at least two groups of radar images, the processor is further configured to execute the instructions to cause the apparatus to:

obtain phase information in the reference radar image;

perform phase registration on the another radar image based on the phase information, to enable a phase of the another radar image in the at least two groups of radar images to be consistent with a phase of the reference radar image; and use the reference radar image and the another radar image obtained after the phase registration as the registered images.

* * * * *